(12) United States Patent
Shan

(10) Patent No.: US 8,791,650 B2
(45) Date of Patent: Jul. 29, 2014

(54) LED LIGHTING SYSTEM

(75) Inventor: Xinxin Shan, Surrey (CA)

(73) Assignee: LED Smart Inc., Edmonton (CA)

( * ) Notice: Subject to any disclaimer, the term of this patent is extended or adjusted under 35 U.S.C. 154(b) by 375 days.

(21) Appl. No.: 13/316,499

(22) Filed: Dec. 10, 2011

(65) Prior Publication Data

US 2012/0319582 A1 Dec. 20, 2012

Related U.S. Application Data

(63) Continuation-in-part of application No. 12/278,393, filed as application No. PCT/CA2007/000207 on Feb. 9, 2007, now Pat. No. 8,115,411, which is a continuation-in-part of application No. 11/351,074, filed on Feb. 9, 2006, now Pat. No. 7,307,391.

(60) Provisional application No. 61/476,962, filed on Apr. 19, 2011.

(30) Foreign Application Priority Data

Aug. 1, 2006 (CA) .................................... 2555065

(51) Int. Cl.
| | |
|---|---|
| H05B 37/02 | (2006.01) |
| H05B 33/02 | (2006.01) |
| H05B 33/08 | (2006.01) |
| F21Y 101/02 | (2006.01) |
| F21V 15/01 | (2006.01) |
| F21Y 103/00 | (2006.01) |
| F21Y 113/00 | (2006.01) |
| F21Y 111/00 | (2006.01) |
| F21S 4/00 | (2006.01) |
| F21V 23/04 | (2006.01) |

(52) U.S. Cl.
CPC ......... *H05B 33/0884* (2013.01); *F21Y 2101/02* (2013.01); *F21V 15/011* (2013.01); *F21Y 2103/003* (2013.01); *F21Y 2113/005* (2013.01); *F21Y 2111/005* (2013.01); *F21S 4/008* (2013.01); *F21V 23/04* (2013.01); *H05B 33/0803* (2013.01); *Y10S 362/80* (2013.01)

USPC ........ 315/294; 315/185 S; 315/195; 315/291; 315/307; 362/545; 362/800

(58) Field of Classification Search
USPC ................ 315/77, 185 S, 195, 291, 294, 307; 362/545, 800
See application file for complete search history.

(56) References Cited

U.S. PATENT DOCUMENTS

| | | |
|---|---|---|
| 5,607,227 A | 3/1997 | Yasumoto et al. |
| 5,655,830 A | 8/1997 | Ruskouski |

(Continued)

FOREIGN PATENT DOCUMENTS

| | | |
|---|---|---|
| DE | 200 18 865 U1 | 2/2001 |
| WO | 20051024291 A2 | 3/2005 |

(Continued)

OTHER PUBLICATIONS

Escobar, J., "Light Emitting Diodes: Gaining visibility in the aviation world," Aircraft Maintenance Technology (Online) <http://www.amtonline.com/publication/article.jsp?publd=1&id=1585> [retrieved Jan. 28, 2006].

(Continued)

*Primary Examiner* — Douglas W Owens
*Assistant Examiner* — Thai Pham
(74) *Attorney, Agent, or Firm* — Christensen O'Connor Johnson Kindness PLLC

(57) ABSTRACT

An LED lighting system is provided for connection to a variable power source providing input power, the LED lighting system having at least one power analyzing and processing circuitry connecting to the variable power source, and being configured to identify one or more characteristics of the input power, where the characteristics are selected from amplitude, frequency and pulse width of the input power, compare one or more of the characteristics of the input power to preset control criteria either in hardware or software or both to yield a comparison result, and then control the current control circuitry according to the comparison result.

21 Claims, 38 Drawing Sheets

(56) References Cited

U.S. PATENT DOCUMENTS

| | | |
|---|---|---|
| 5,785,418 A | 7/1998 | Hochstein |
| 6,019,493 A | 2/2000 | Kuo et al. |
| 6,158,882 A | 12/2000 | Bischoff, Jr. |
| 6,203,180 B1 | 3/2001 | Fleischmann |
| 6,238,075 B1 | 5/2001 | Dealey, Jr. et al. |
| 6,283,612 B1 | 9/2001 | Hunter |
| 6,340,868 B1 | 1/2002 | Lys et al. |
| 6,388,393 B1 | 5/2002 | Illingworth |
| 6,472,823 B2 | 10/2002 | Yen |
| 6,583,550 B2 | 6/2003 | Iwasa et al. |
| 6,590,343 B2 | 7/2003 | Pederson |
| 6,725,598 B2 | 4/2004 | Yoneda |
| 6,860,628 B2 | 3/2005 | Robertson |
| 6,871,981 B2 | 3/2005 | Alexanderson |
| 6,936,968 B2 | 8/2005 | Cross |
| 6,957,905 B1 | 10/2005 | Pritchard |
| 6,963,175 B2 | 11/2005 | Archenhold |
| 7,014,336 B1 | 3/2006 | Ducharme |
| 7,014,337 B2 | 3/2006 | Chen |
| 7,049,761 B2 | 5/2006 | Timmermans |
| 7,164,235 B2 | 1/2007 | Ito |
| 7,202,613 B2 | 4/2007 | Morgan |
| 7,204,615 B2 | 4/2007 | Arik |
| 7,220,018 B2 | 5/2007 | Crabb |
| 7,355,523 B2 | 4/2008 | Sid |
| 7,510,299 B2 | 3/2009 | Timmermans |
| 7,815,338 B2 * | 10/2010 | Siemiet et al. ............... 362/218 |
| 2003/0048641 A1 | 3/2003 | Alexanderson |
| 2004/0105264 A1 | 6/2004 | Spero |
| 2005/0135104 A1 | 6/2005 | Crabb |
| 2005/0162093 A1 | 7/2005 | Timmermans |
| 2005/0168985 A1 | 8/2005 | Chen |
| 2005/0190553 A1 | 9/2005 | Lynch |
| 2005/0265019 A1 | 12/2005 | Sommers |
| 2005/0281030 A1 | 12/2005 | Leong |
| 2006/0193131 A1 | 8/2006 | McGrath |
| 2007/0228999 A1 | 10/2007 | Kit |
| 2009/0058317 A1 * | 3/2009 | Tsai et al. ............... 315/291 |
| 2010/0181925 A1 * | 7/2010 | Ivey et al. ............... 315/224 |

FOREIGN PATENT DOCUMENTS

| | | |
|---|---|---|
| WO | 20051031860 A2 | 4/2005 |
| WO | 20091154321 A1 | 12/2009 |

OTHER PUBLICATIONS

Extended European Search Report mailed Jul. 1, 2010, issued in corresponding European Patent Application No. EP 07 71 0621, filed Feb. 9, 2007, 9 pages.

International Search Report and Written Opinion mailed Aug. 16, 2012, issued in corresponding International Application No. PCT/CA2012/050251, filed Apr. 19, 2012, 8 pages.

"LED Lighting," EMTEQ Lighting Online Product Information, <http://www.emteq.com/led_intro.html> [retrieved Jan. 28, 2006].

Service, R.F., "Organic LEDs Look Forward to a Bright, White Future," Science Magazine 310:1762-1763, Dec. 16, 2005.

* cited by examiner

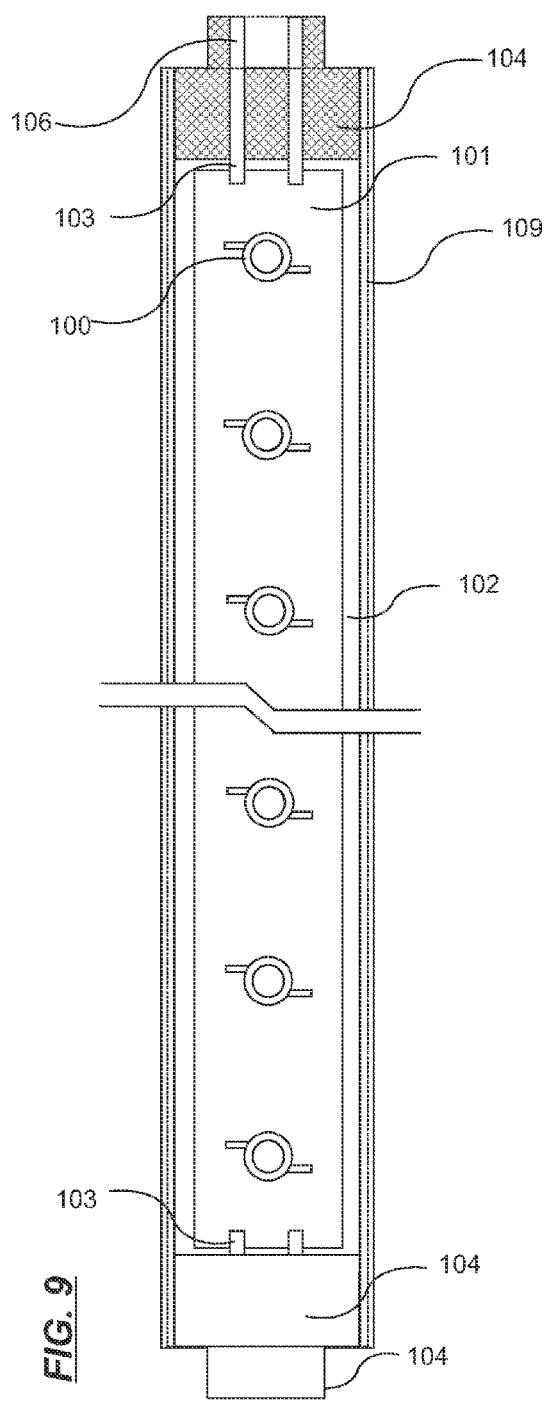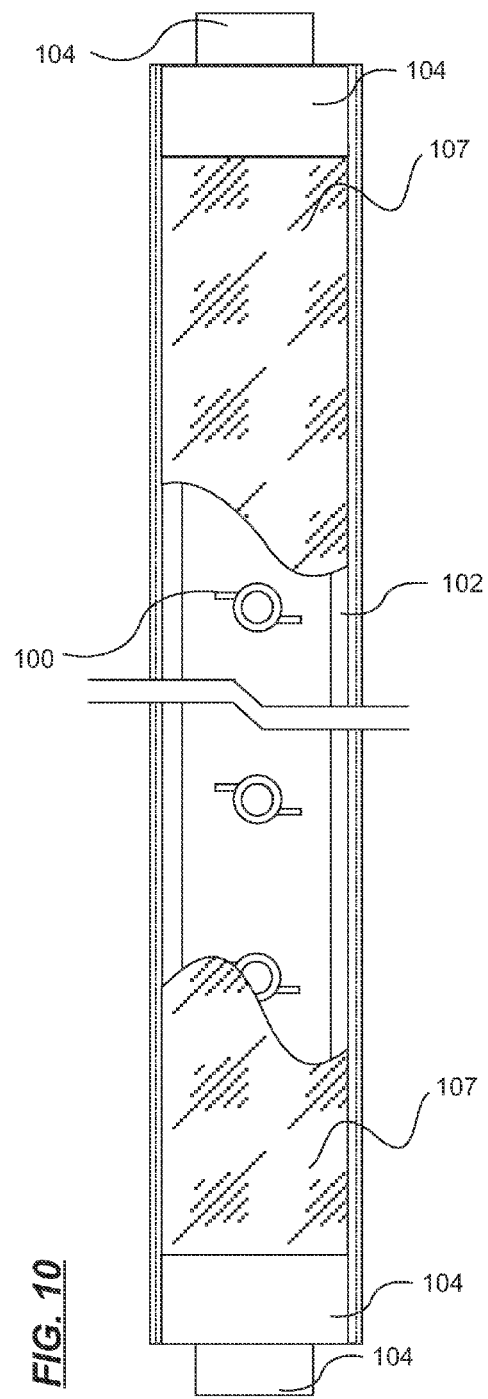

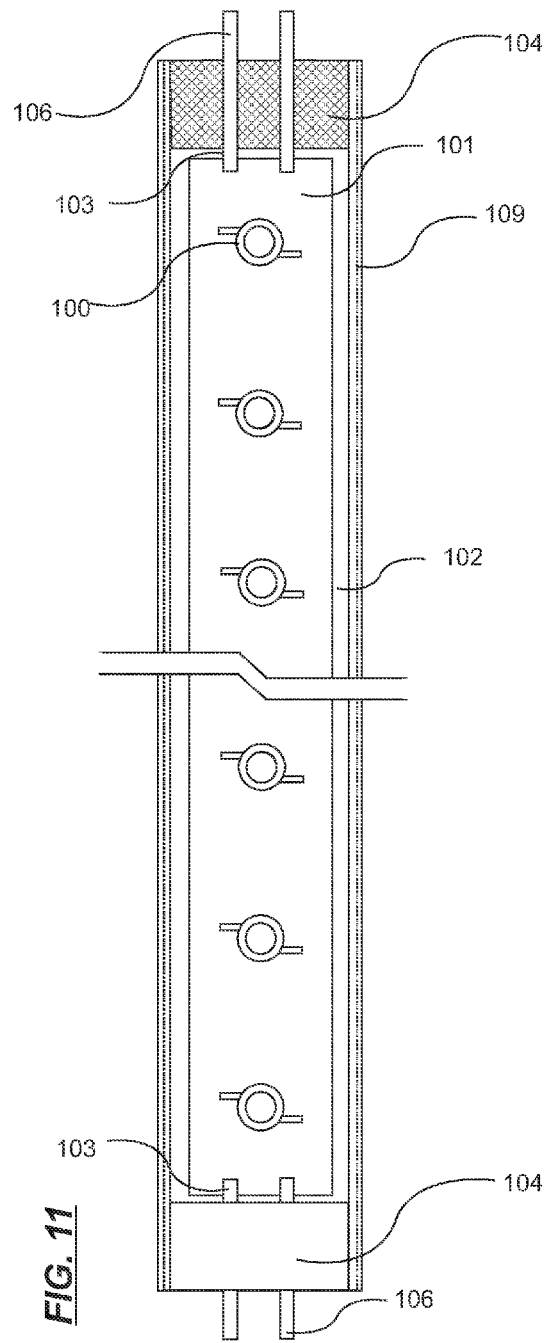
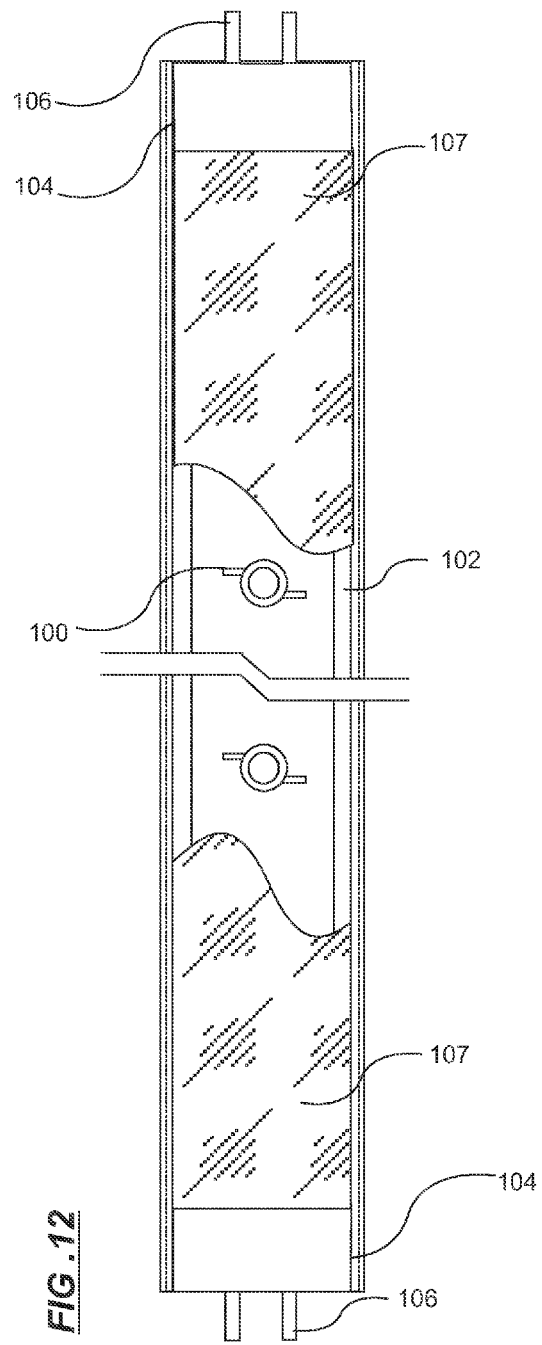
FIG. 11
FIG. 12

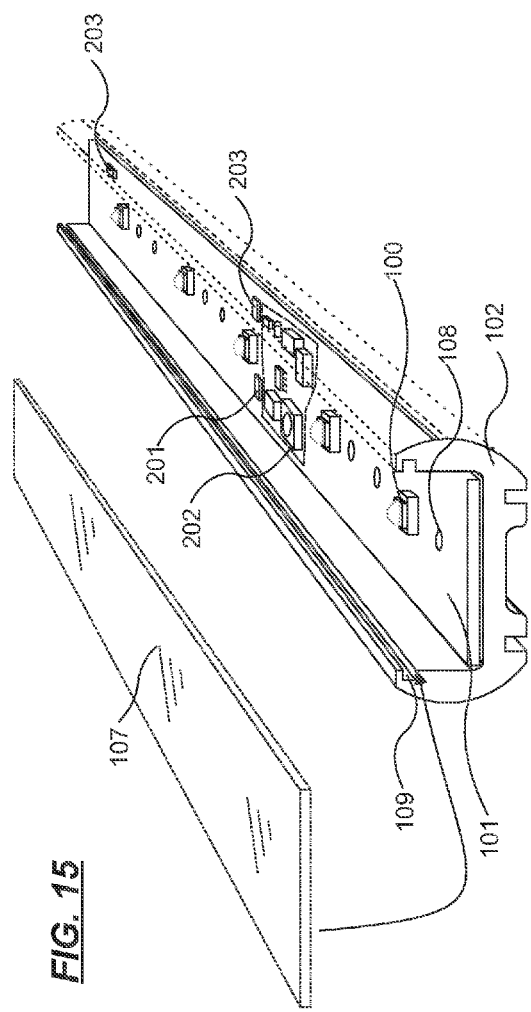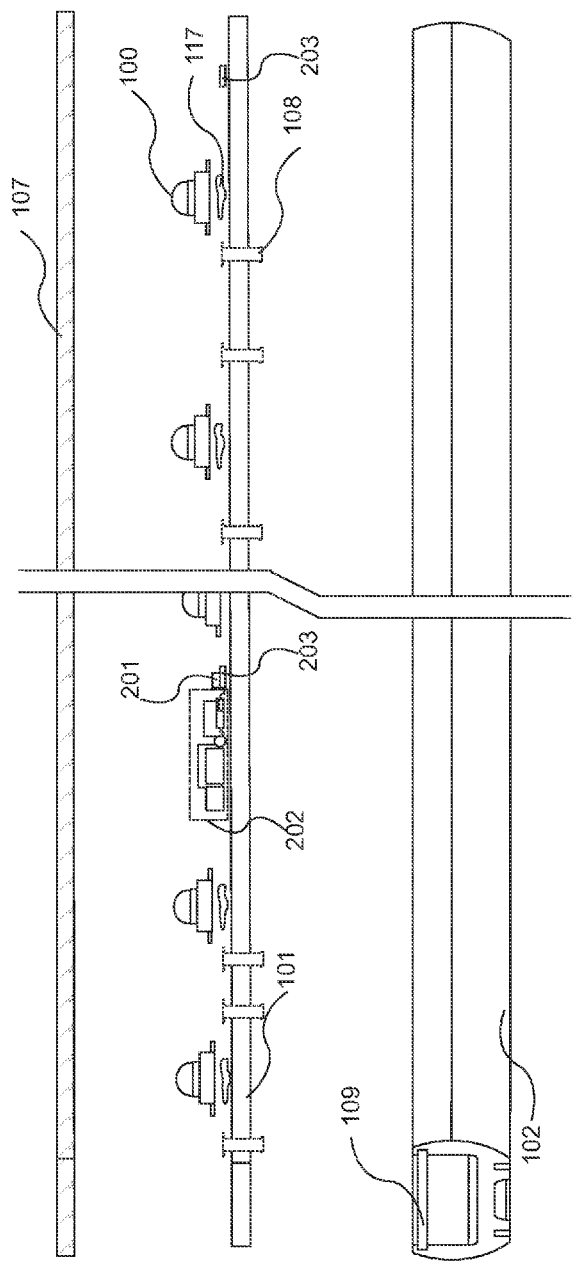
FIG. 15
FIG. 16

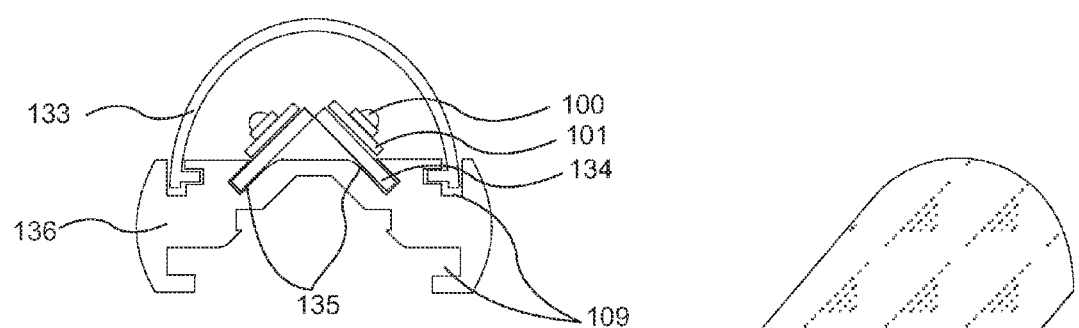
FIG. 38
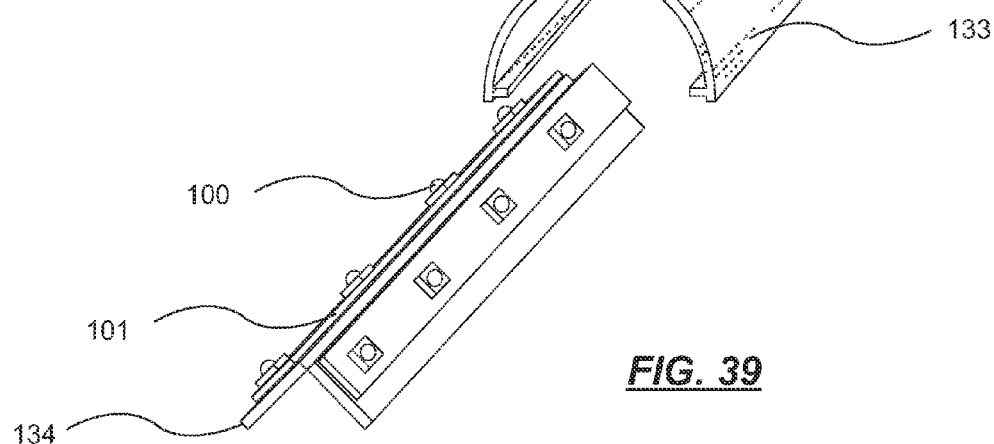
FIG. 39
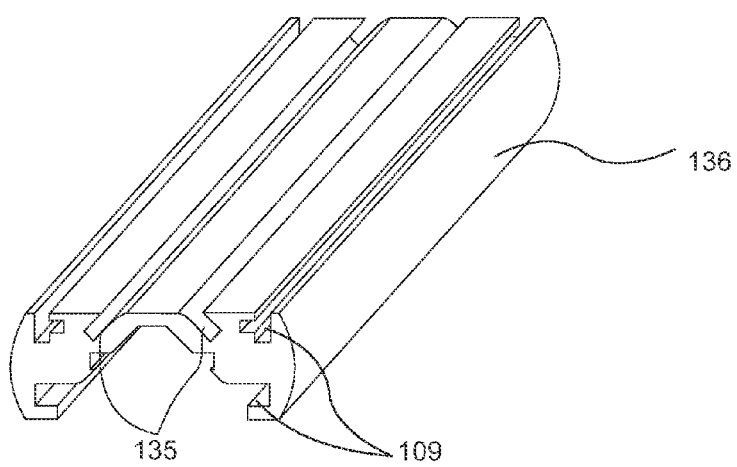

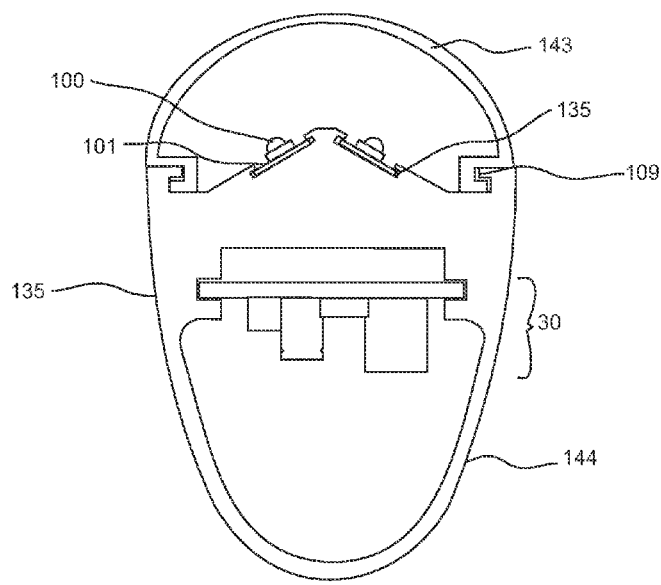
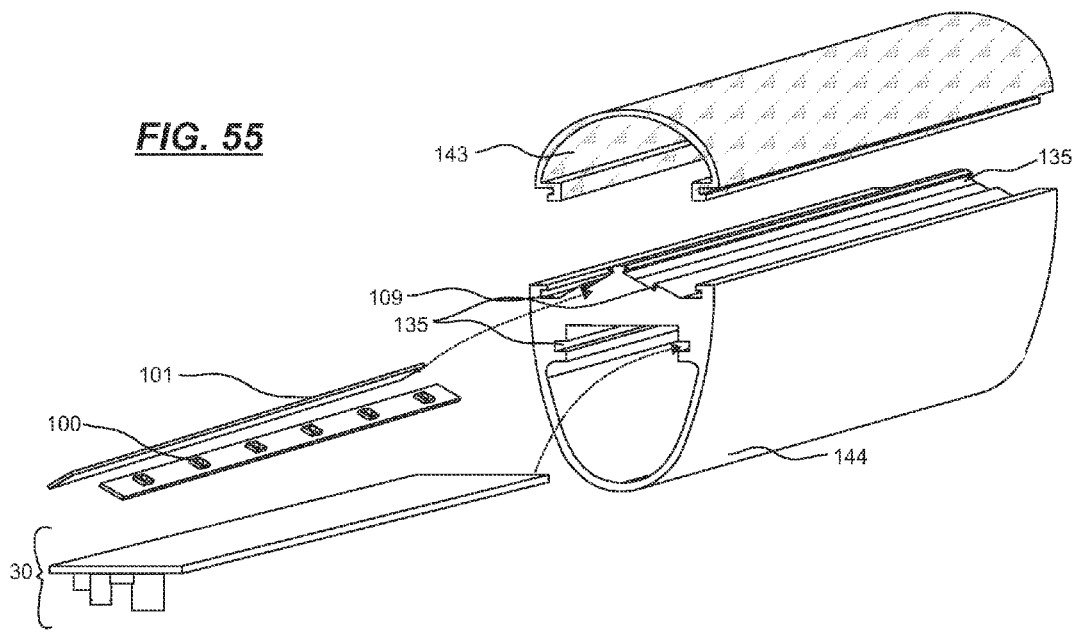

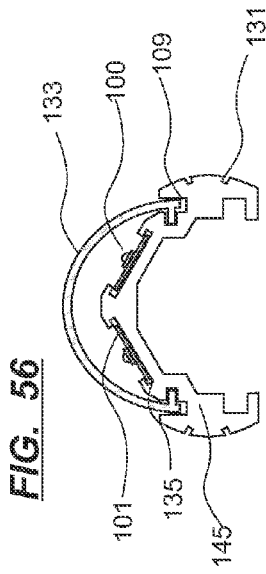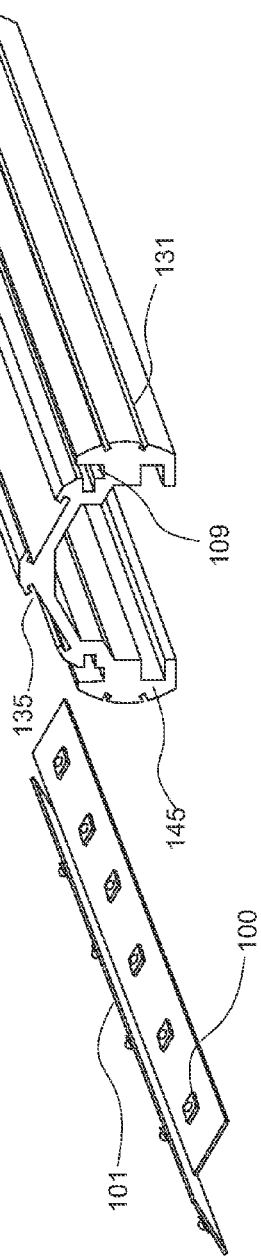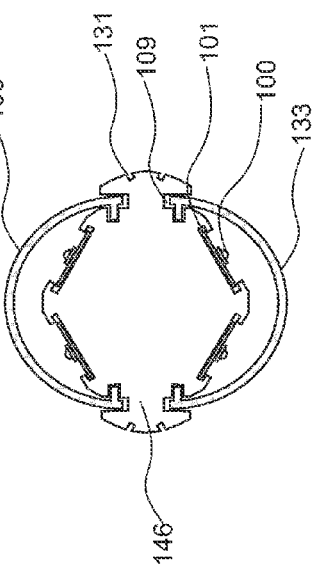

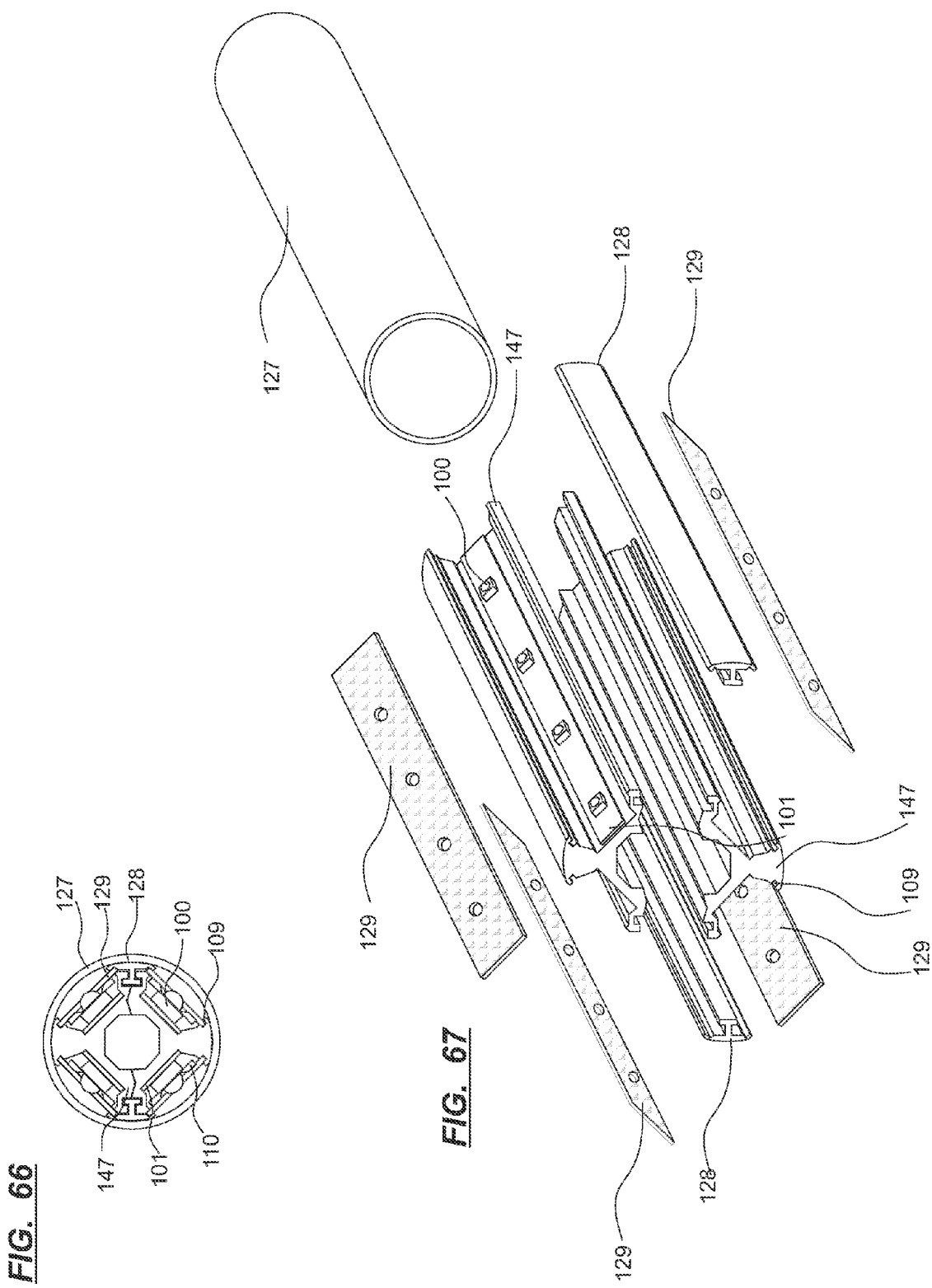

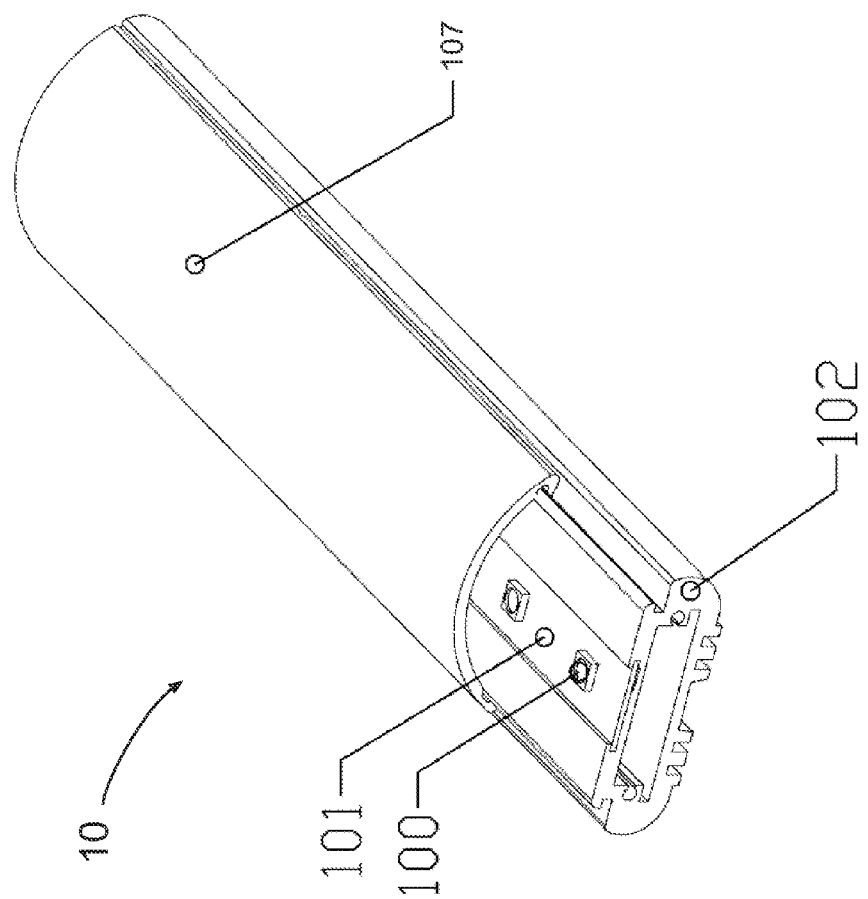

LED LIGHTING SYSTEM

CROSS-REFERENCE TO RELATED APPLICATIONS

This application is a continuation-in-part of U.S. application Ser. No. 12/278,393, filed Dec. 1, 2008, which is a U.S. national phase of International Application No. PCT/CA2007/000207, filed Feb. 9, 2007, which is a continuation-in-part of U.S. application Ser. No. 11/351,074, filed Feb. 9, 2006, now U.S. Pat. No. 7,307,391.

This application claims the benefit under 35 U.S.C. §119 (e) of U.S. Provisional Application No. 61/476,962, filed Apr. 19, 2011.

TECHNICAL FIELD

LED lighting control.

BACKGROUND

Traditionally to control LED lights a control signal has to be provided to the lights either through a separated control pin or wire, or wireless technology, or technologies like signal carrier, or the LED lights operate in a master-slave mode. When the LED lights work in master-slave mode the LED arrays are controlled by the power source directly. For example the power source's voltage is applied to the LEDs directly, so the LEDs are lit up when the voltage goes up and dim down when the voltage goes down.

SUMMARY

An LED lighting system is provided for connection to a variable power source providing input power, the LED lighting system having at least one power analyzing and processing circuitry connecting to the variable power source, and being configured to identify one or more characteristics of the input power, where the characteristics are selected from amplitude, frequency and pulse width of the input power, compare one or more of the characteristics of the input power to preset control criteria either in hardware or software or both to yield a comparison result, and then control the current control circuitry according to the comparison result. The LED lighting system may also have one or more of a support structure spanning between a first end and a second end, the support structure made of rigid material, the support structure being sufficiently heat conductive to provide heat dissipation for the LEDs; an electrical connector for connection to the variable power source at least at the first end or between the first end and second end; at least one LED array extending along the support structure; power control circuitry for the at least one LED array, the power control circuitry being carried by the support structure and being in electrical communication with the electrical connector; and a circuit board supporting the at least one LED array, the corresponding power control circuitry being provided on the circuit board; the at least one LED array being divided into sets of LEDs; the power control circuitry being formed of one or multiple current controllers, each of the one or multiple current controllers providing current control for a corresponding set of LEDs in the LED array. In some embodiments, sets of LEDs may be of the same or different colors, and the current control circuitry may provide same or different current control for a corresponding set of LEDs in the LED array according to the comparison result.

In various embodiments of the LED lighting systems described here, there may for example be a support structure forming a channel and being heat conductive and rigid, with one or both ends of the support structure having electrical connectors for connection to a power source. An LED array in some embodiments extends along the support structure for example within the channel, and in some embodiments supported in slots, each LED in the LED array may have in some embodiments a power rating of greater than 0.1 watt. The power supply circuitry in some embodiments is provided by current control circuitry, for example onboard circuitry, carried by the support structure, in some embodiments within the channel, and may provide current control for individual sets of LEDs. The current control allows careful control of the forward current passing through the LED array so that it controls the brightness and heat production by the LEDs. Devices with full 360 degree illumination are disclosed, along with devices with LEDs having differently angled illumination fields. Various electrical power supplies, structural support configurations and shapes, lens configurations, and overall structural configurations are also disclosed.

BRIEF DESCRIPTION OF THE DRAWINGS

There will now be described embodiments of an LED lighting system, with reference to the drawings, by way of illustration only, in which like numerals denote like elements and in which:

FIG. 9 is a top view of recessed double contact base-two pin design, one end cross cut, to view interior configuration;

FIG. 10 is a top view of recessed double contact base-two pin design, with lens;

FIG. 11 is a top view of 'bi-pin'-two pin design, one end cross cut, to view interior configuration;

FIG. 12 is a top view of 'bi-pin'-two pin design, with lens;

FIG. 15 is a 3-D view of the LED Lighting tube, without end fittings;

FIG. 16 is a 3-D side view of the LED Lighting tube, without end fittings;

FIG. 38 is a cross cut view of an LED lighting system with LED arrays facing different directions;

FIG. 39 is a view of multiple sections of an LED lighting system with LED arrays facing different directions;

FIG. 54 is a section through a further embodiment of an LED lighting system with a domed support structure;

FIG. 55 is an exploded view of the embodiment of FIG. 54;

FIG. 56 is a section through a further embodiment of an LED lighting system with differently angled LED arrays;

FIG. 57 is an exploded view of FIG. 56;

FIG. 58 is a section through a further embodiment of an LED lighting system with differently angled LED arrays;

FIG. 66 is a section through a further embodiment of an LED lighting system with 360 degree coverage;

FIG. 67 is an exploded view of the embodiment of FIG. 66;

FIG. 74 is a 3-D view of a low-profile LED lighting system, without end fitting.

DETAILED DESCRIPTION

Figure 1:
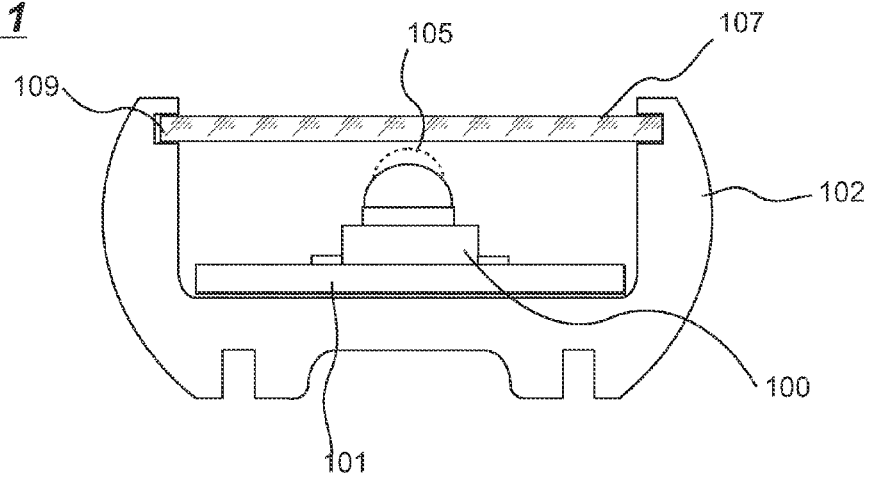
FIG. 1 is a cross cut view from inside of single pin type LED lighting system.
Figure 2:
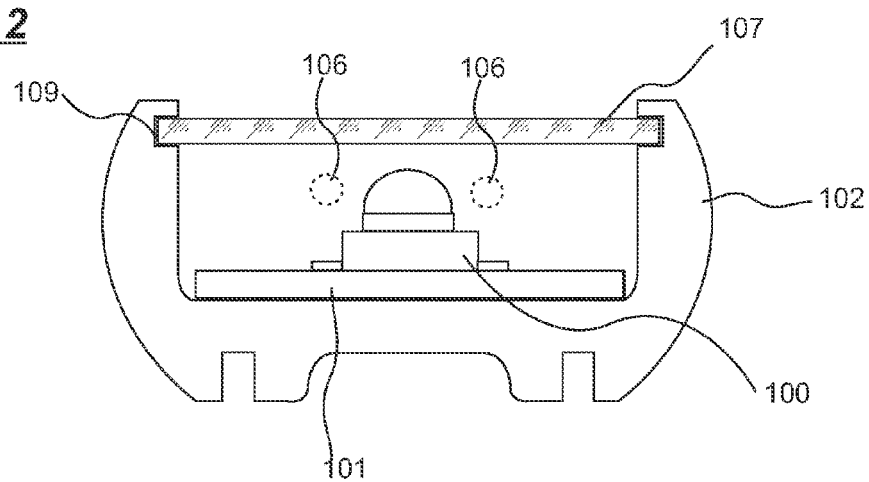
FIG. 2 is a cross cut view from inside of 'bi-pin'-two pin type LED lighting system.
Figure 3:
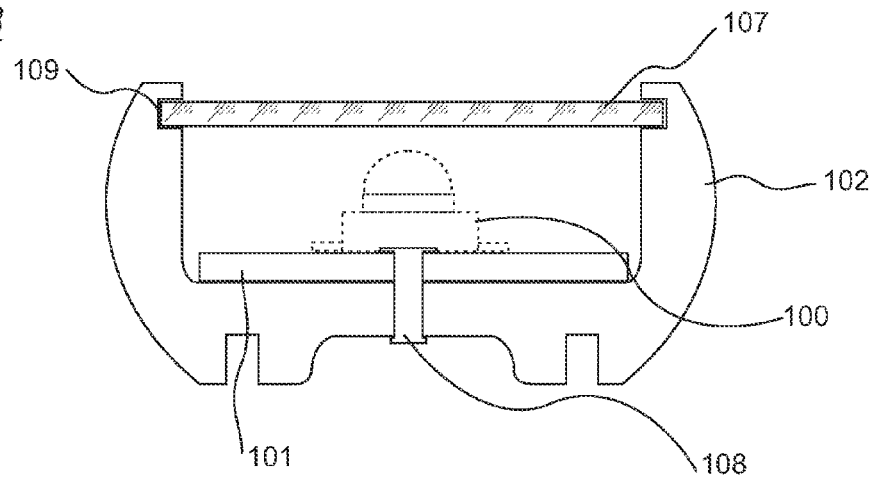
FIG. 3 is a cross cut view from inside single or 'bi-pin'-two pin type of LED lighting system showing permanent, for example, rivet or screw, mounting.
Figure 4:
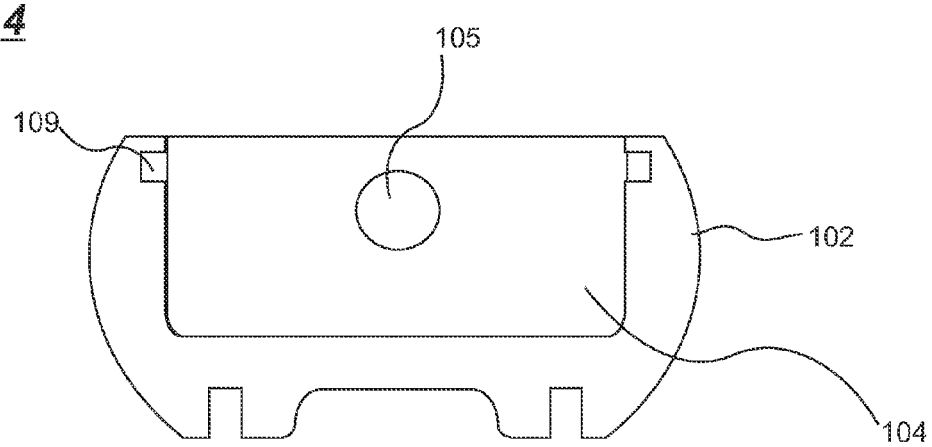
FIG. 4 is an end view of single pin type of LED lighting system.
Figure 5:
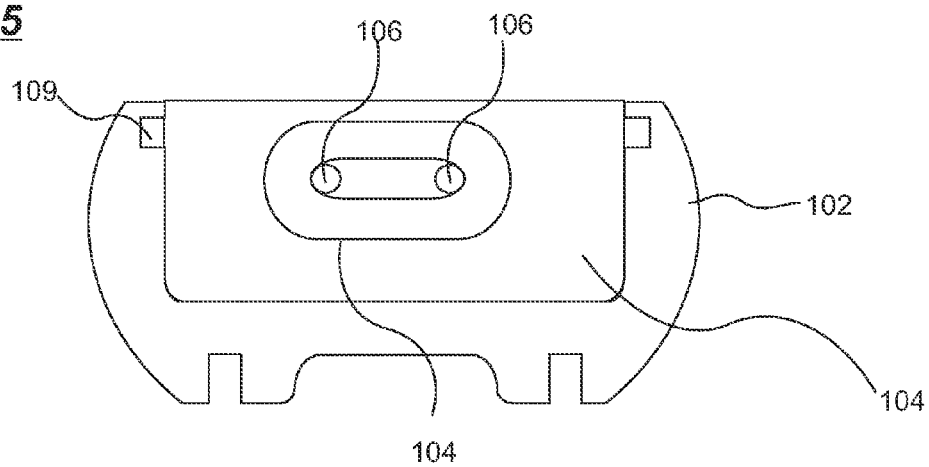
FIG. 5 is an end view of recessed double contact base, two pin type LED lighting system.
Figure 6:
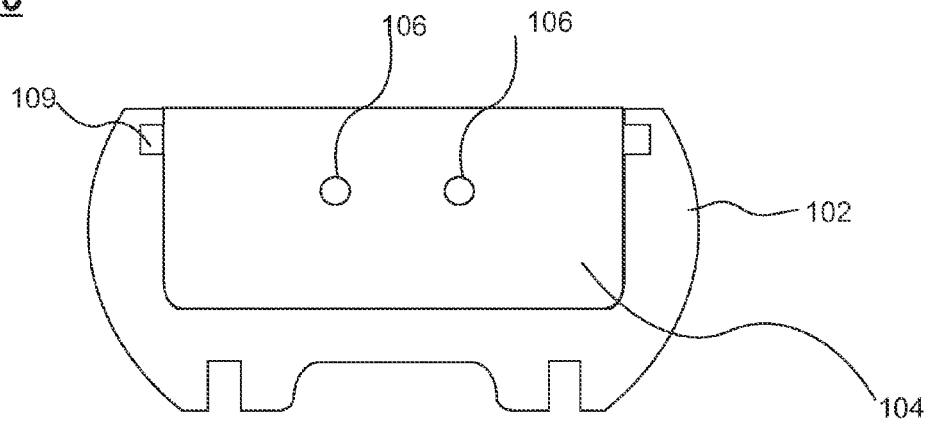
FIG. 6 is an end view of 'bi-pin', two pin type LED Lighting Tube.
Figure 7:
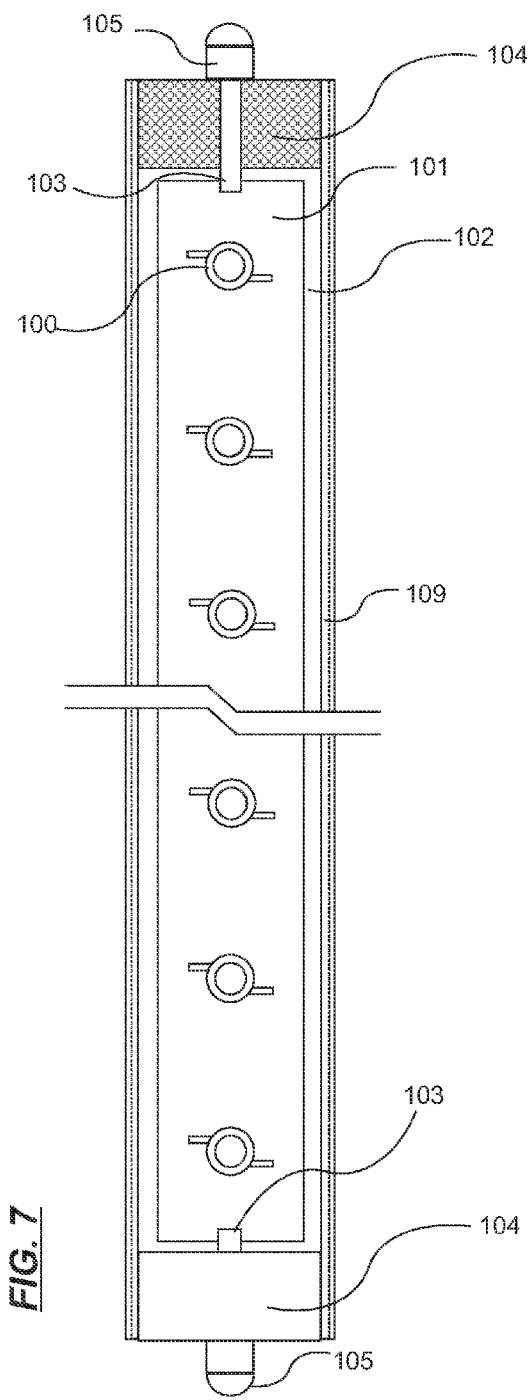
FIG. 7 is a top view of single pin design, one end cross cut, to view interior configuration.
Figure 8:
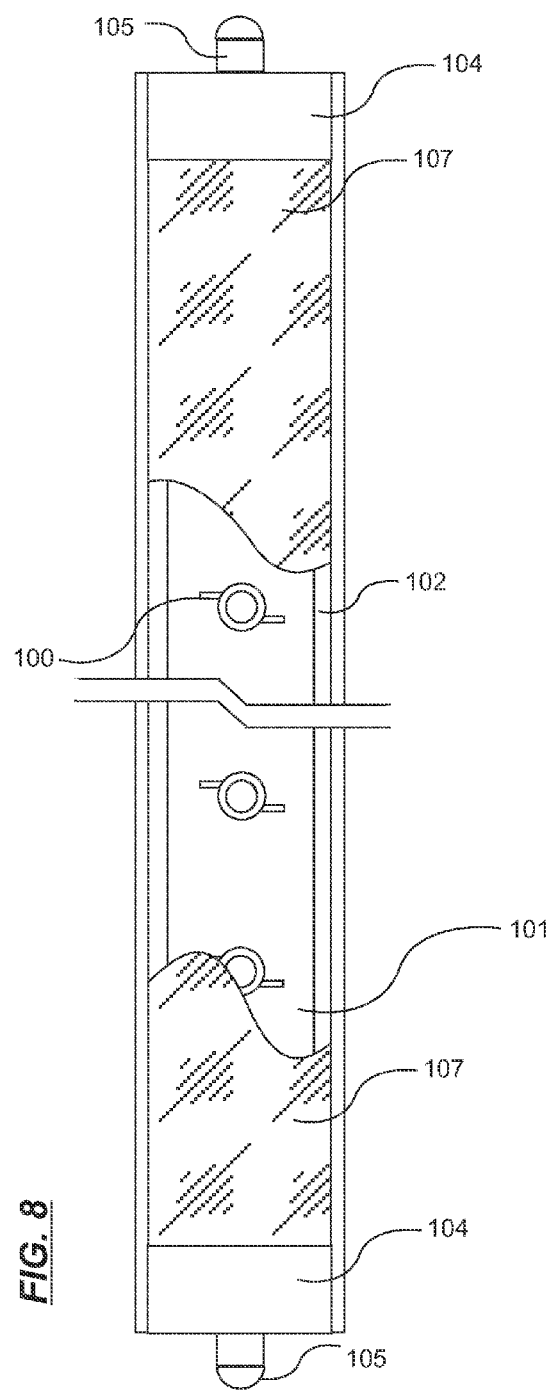
FIG. 8 is a top view of single pin design, with lens.

In this patent document, "comprising" means "including". In addition, a reference to an element by the indefinite article "a" does not exclude the possibility that more than one of the element is present. Each one of the individual features described here may be used in one or more embodiments and is not, by virtue only of being described here, to be construed as essential to all embodiments as defined by the claims.

In FIGS. 1-3, 7-12, there is shown an exemplary LED lighting system 10 that includes a plurality of LEDs 100, each LED 100 being supplied power from a circuit board 101 supported by support structure 102. Support structure 102 in one embodiment forms a channel and is made of a heat conductive and rigid material, such as aluminum, ceramic or any thermally conductive formable material. In one embodiment, the support structure 102 is both heat conductive and rigid and is made of a unitary piece of material. The support structure 102 is rigid and extends from end to end of the LED lighting system 10. The heat sink capability may be continuous from end to end or may be semi-continuous. In the case of being semi-continuous, the material providing the heat sink function may have breaks, in which case additional connector material is required to provide the channel with sufficient rigidity so that the lighting system 10 does not collapse or sag under its own weight. The circuitry 20 or 30 provide current control for the LED lighting system 10 and are attached to the support structure 102 permanently such as by fasteners 108 (FIG. 3), which may be rivets or screws, so they do not allow for vibration to loosen the connection between the circuit board 101 and the support structure 102 over time. The support structure 102 does not require adhesive, or thermally conductive substance to connect to the circuit board 101. The support structure 102 provides a rigid backbone structure to the LED lighting system 10, and is sufficiently rigid to prevent the LED lighting system 10 to resist or prevent breakage during normal use, or bending, unless the product design requires it. The support structure 102 may be provided with a cover 107 secured in a groove 109 that runs along the inside edge of the support structure walls. The cover 107 is transparent or translucent and may be formed as a lens.

At one or both ends of the support structure 102 there are provided electrical connectors 103, 105, and 106 for connection of the lighting system 10 to a power source. When LED lighting system 10 is configured as a bulb, rather than as tube, it will typically have connectors only at one end. In the embodiment of FIGS. 1, 4, 7 and 8, a single connector 105 of Pin Type 1 is formed in end caps of the support structure 102. In the embodiment of FIGS. 2, 5, 6, and 9-12 double connectors 106 of Pin Type 2, either in the bi-pin format (FIGS. 6, 11 and 12) or the recessed double contact type (FIGS. 5, 9 and 10) are formed in end caps 104 of the support structure 102. These connectors 105, 106 are of conventional design. The end caps 104 may be any suitable material such as plastic, Lexan™, polycarbonate, acrylic, ABS, metal such as aluminum, copper, brass, stainless steel, metal alloy, combination of metal and plastic, or fiberglass. The end caps 104 may be manufactured in different shapes and sizes, all able to connect to the circuit boards 101 within the support structure 102. The end caps 104 encase the channel, are secured against movement and do not break with vibration. The end caps 104 also secure and prevent movement of the lens 107, 118-127. As with the other components of the lighting system 10, the end caps 104 should be made to withstand high ambient temperatures (up to 125° C.+) and low ambient temperatures (as low as −40° C.). In the case of use of the LED lighting system 10 as a fluorescent light fixture replacement, the connectors 105, 106 are conventional pins for attached to fluorescent light fixture receptacles. In other embodiments, such as when the LED lighting system 10 is used in a single socket fixture, the connectors 106 may be provided at one end only of the support structure 102.

An LED array formed of LEDs 100 extends along the support structure within the channel formed by the support structure 102. To provide sufficient power to provide light, particularly in an industrial or commercial environment, each LED 100 in the LED array should have a power rating sufficient to provide the desired degree of light, including in the case of vehicles used for transportation a sufficient degree of light to meet regulatory requirements. For example, such requirements may be met by LEDs having a power rating of greater than 0.1 watt, depending on the efficiency of the LED in converting power to light energy. The LEDs may also be organic LEDs or any other suitable LED now known or later developed.

The circuit boards 101 provide in one embodiment onboard current control circuitry for the LED array. The circuit boards 101 are carried by the support structure 102 and are in electrical communication with the electrical connectors 103. 105, 106. The LEDs 100 are preferably organized in groups of LEDs, either in series, or parallel. The LEDs may be surface mounted (SMT) or through hole mounted (TH). The color of the LEDs can be any available color such as white, blue, green, red, yellow, amber, purple, pink, or orange.

Figure 13:
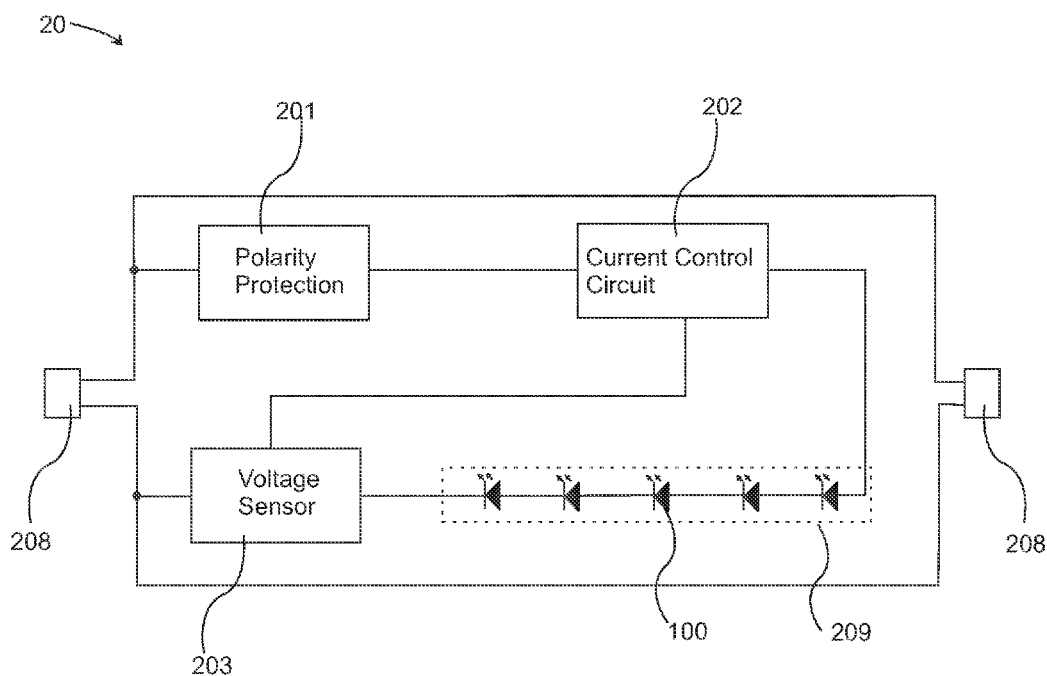
FIG. 13 is a block diagram of single series of electronics (1.5V~72V) for onboard current control.
Figure 14:
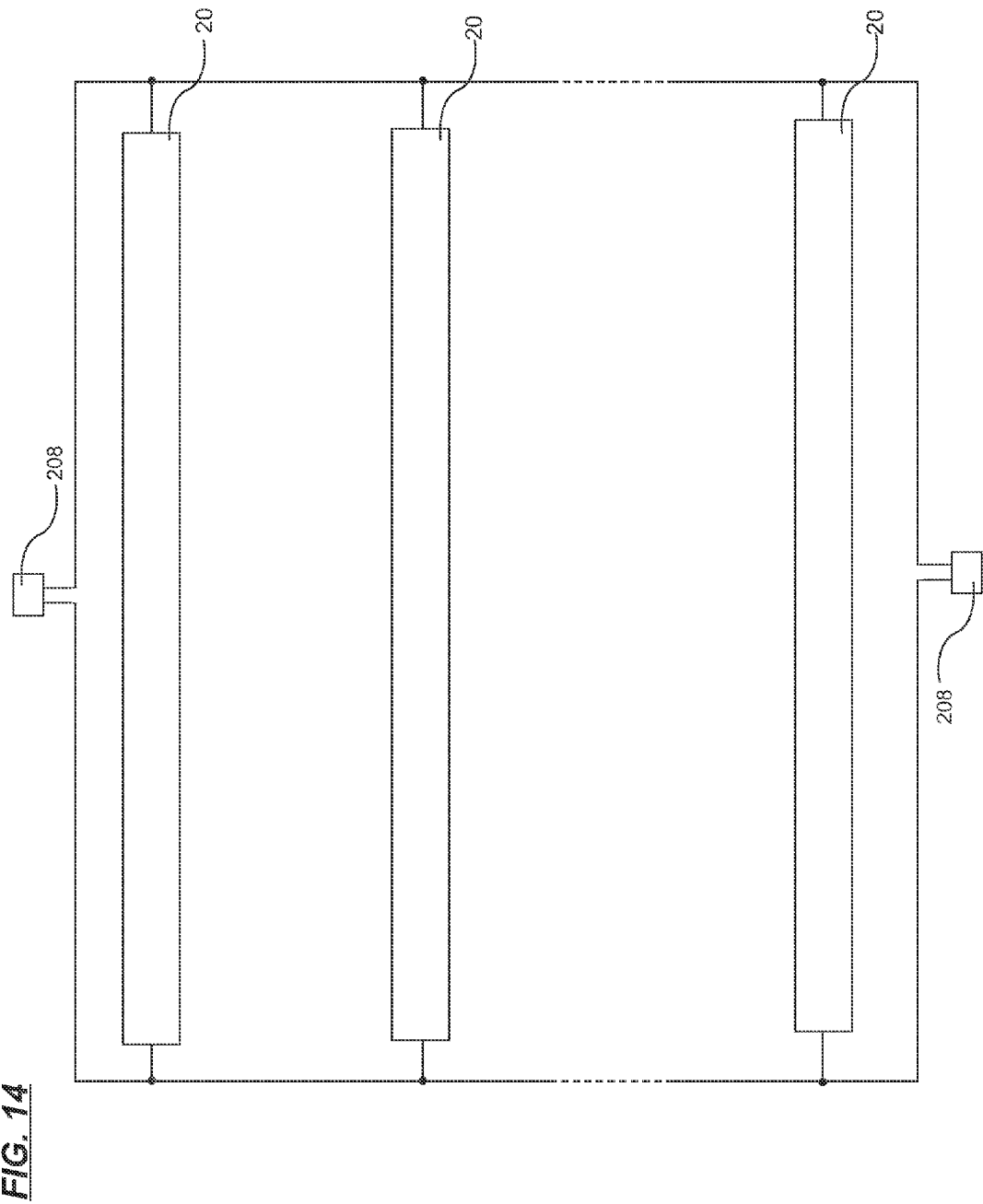
FIG. 14 is a block diagram of multi series of electronic configuration (1.5V~72V) for onboard current control.

FIGS. 13 and 14 show circuit diagrams with an example circuit 20 for onboard current control. The circuits of FIGS. 13, 14, 35, 36 may all be placed on the circuit board or boards 101. FIG. 13 illustrates a single circuit 20 connected to a conventional power source 208, while FIG. 14 shows multiple circuits 20 in parallel connected to a conventional power source 208. The circuit boards 101 for the circuits 20 may be made of fiberglass based printed circuit board (PCB) or metal based (for example Aluminum) PCB or any other suitable PCB material now known or later developed. The circuit boards 101 may be TH type or SMT type. Preferably, the surface of the circuit boards 101 have a white solder mask and exposed areas of tinned plane so as to efficiently reflect the majority of LED light. The circuit boards 101 may be flexible to accommodate mounting channels and lighting fixtures in different shapes and curves. As shown in FIGS. 13 and 14, the LED array is divided into sets 209 of LEDs, with for example five LEDs per set. As shown in FIG. 14, the onboard current control circuitry is formed of multiple circuits 20. Each circuit 20 provides current control for a corresponding set 209 of LEDs in the LED array.

The onboard current control circuitry 20 is configured to provide constant current to the LEDs 100 of the LED array 209. A polarity protection circuit 201 of conventional design safeguards against the user installing the product in the wrong polarity. Current control is provided by current control circuit 202, also of conventional design. As an example, the current control circuit 202 may be use pulse width modulation (PWM) to control the current supplied to the LEDs. The circuit 202 supplies constant, controlled, current to unit for the entire LED set 209 with information from voltage sensor 203. The voltage sensor 203 receives current information from LEDs 209 and feeds back information to the current control circuitry 202. For example, in the use of PWM, the voltage sensor 203 converts the current of LED array 209 to voltage signal and supplies the voltage signal to the current control circuit 202. The current control circuit 202 senses how much the detected voltage varies from the desired level, and by varying the pulse width or frequency, changes the current supplied to the LEDs towards the desired level. The power supply 208 may be AC or DC, although in the example shown it is DC. Current control provides constant brightness and prevents overheating. A typical pulse frequency for the current control may be 200 kHz to 4 MHz. This low voltage application shown here provides voltage for applications below about 72 volts.

The organization of the circuit boards 101 is shown in FIGS. 15 and 16. FIG. 15 shows a single set of five LEDs 100 with circuit components 201, 202 and 203. FIG. 16 shows an exploded side view of an LED lighting system 10, with support structure 102, cover 107 and with LEDs 100, which LEDs may be for example secured or joined to a circuit board 101 by any suitable means as for example soldering or heat sink compound 117.

Figure 17:
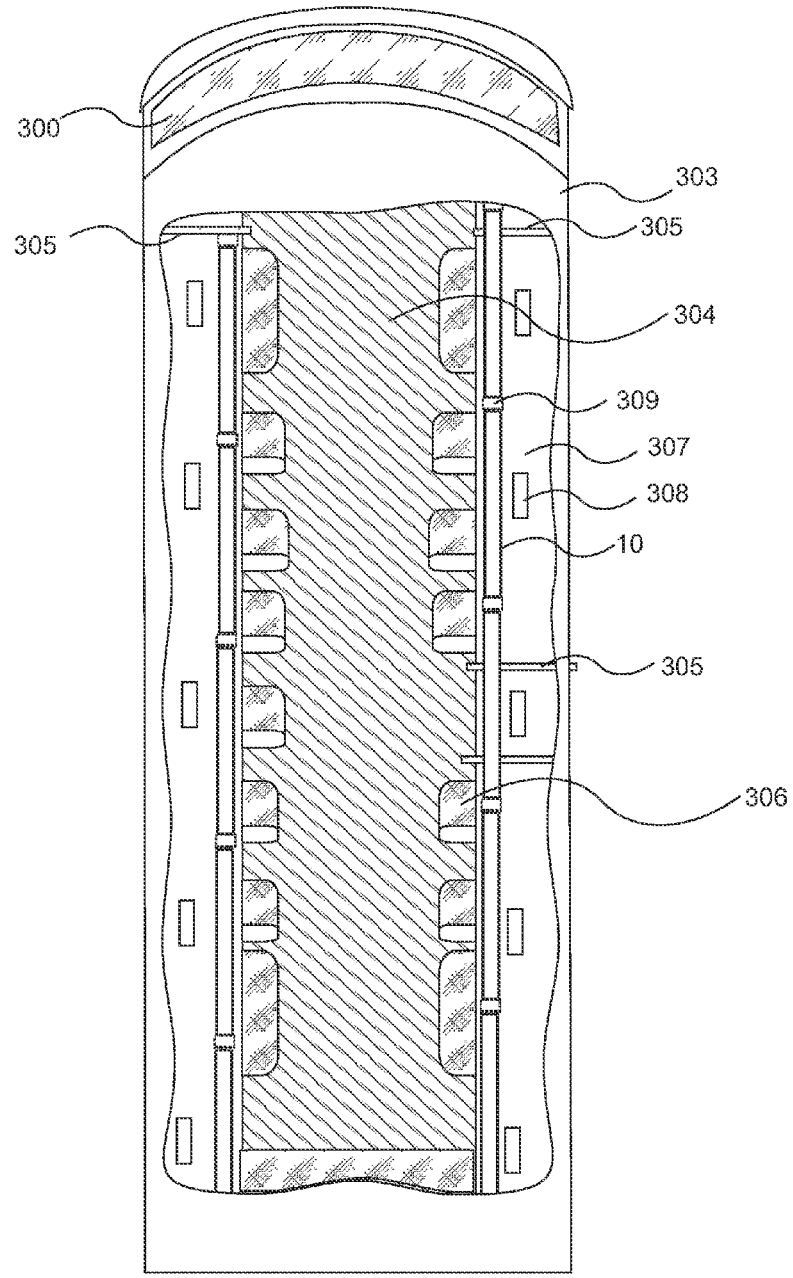
FIG. 17 shows an LED lighting system in a mass-transit application, bus shown here for reference purposes, new or retrofit application.
Figure 18:
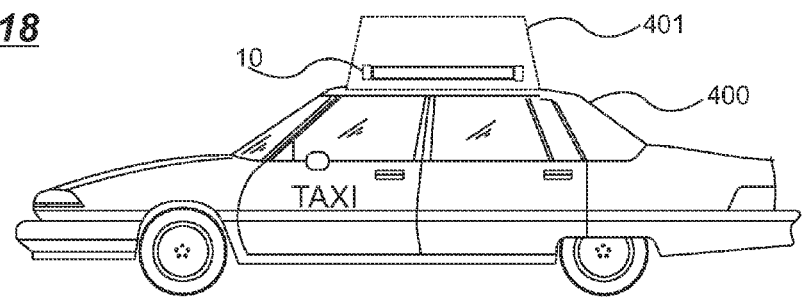
FIG. 18 shows an LED lighting system in a vehicle application, taxi side view, for taxi advertisement sign.
Figure 19:
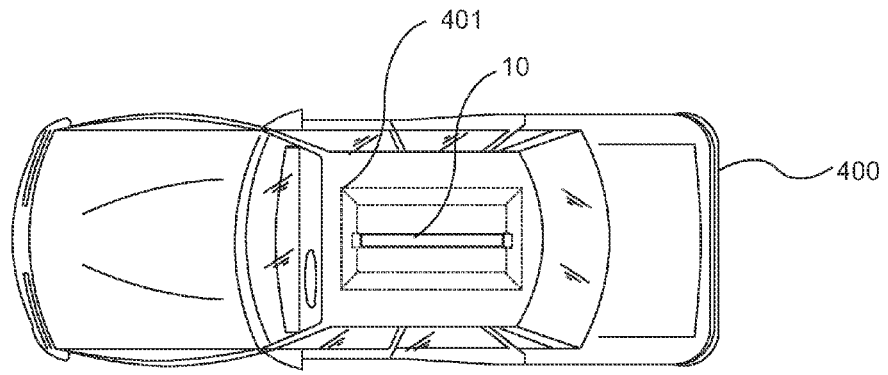
FIG. 19 shows an LED lighting system in a vehicle application, taxi top view, for taxi advertisement sign.
Figure 20:
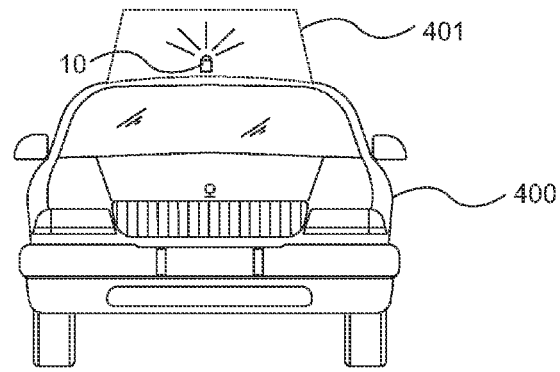
FIG. 20 shows an LED lighting system in a vehicle application, taxi front view, for taxi advertisement sign.
Figure 21:
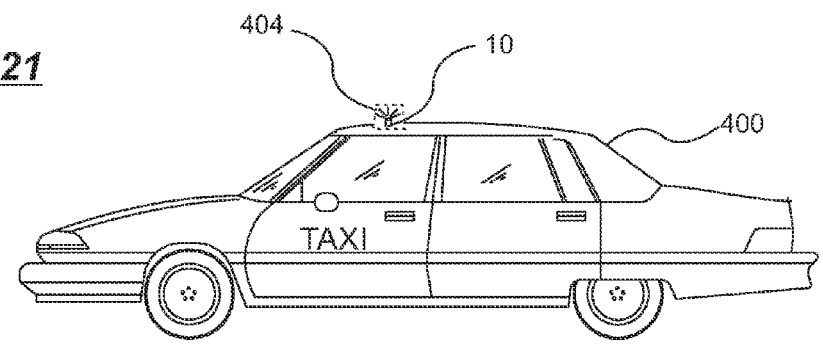
FIG. 21 shows an LED lighting system in a vehicle application, taxi side view, for taxi 'on-duty' sign.
Figure 22:
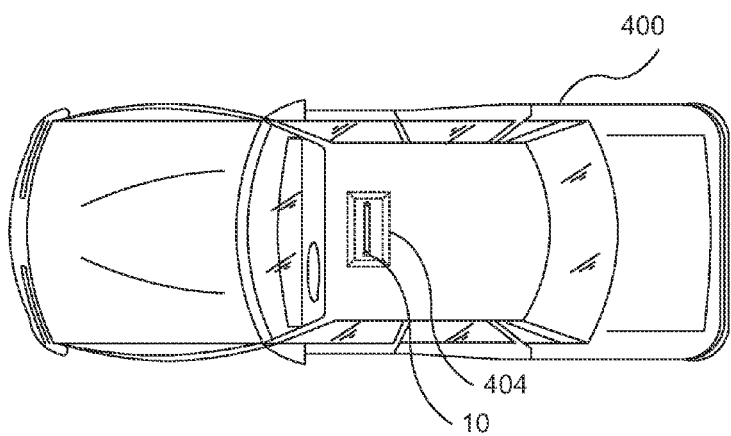
FIG. 22 shows an LED lighting system in a vehicle application, taxi top view, for taxi 'on-duty' sign.
Figure 23:
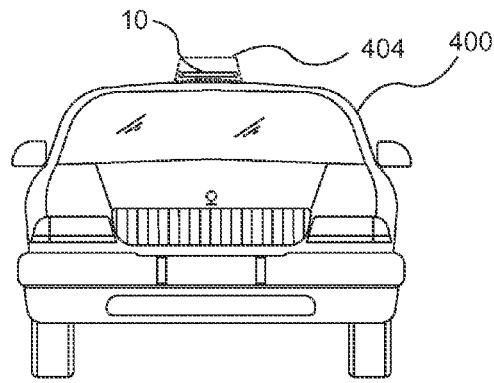
FIG. 23 shows an LED lighting system in a vehicle application, taxi front view, for taxi 'on-duty' sign.
Figure 24:
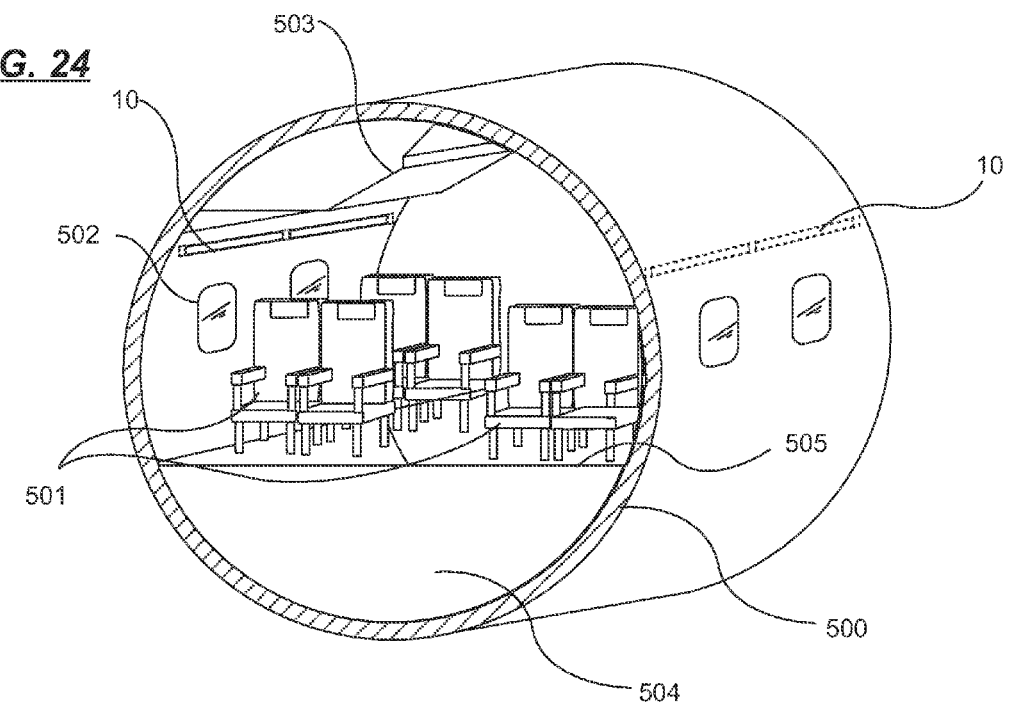
FIG. 24 shows an LED lighting system in an airplane application, cross cut view of fuselage.
Figure 25:
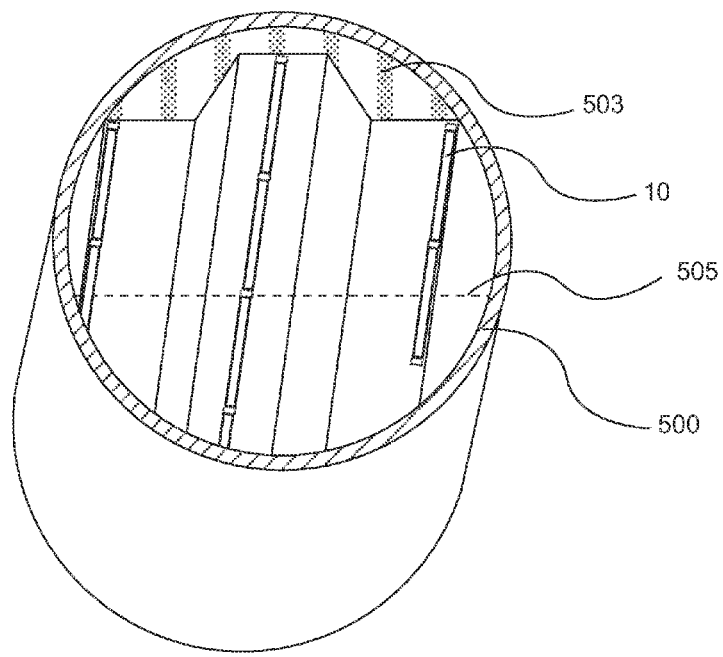
FIG. 25 shows an LED lighting system in an airplane application, bottom view of fuselage.
Figure 26:
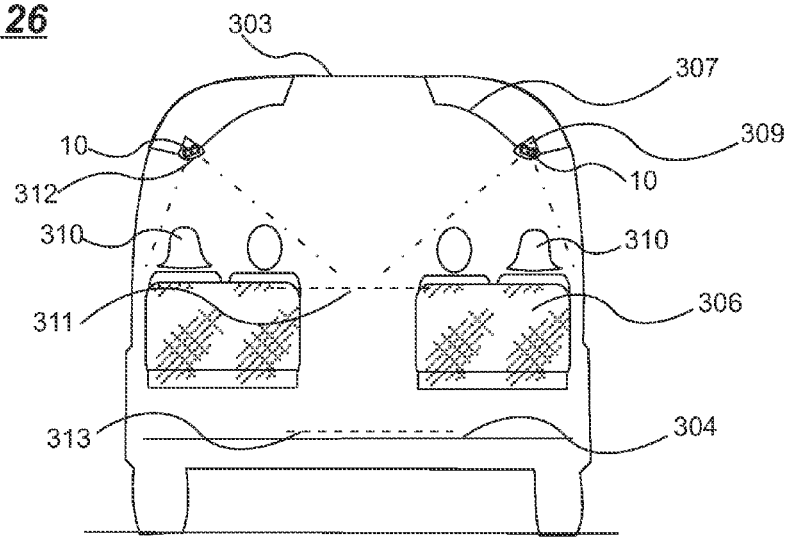
FIG. 26 shows an LED lighting system in a mass-transit application, cross cut view of bus.
Figure 27:
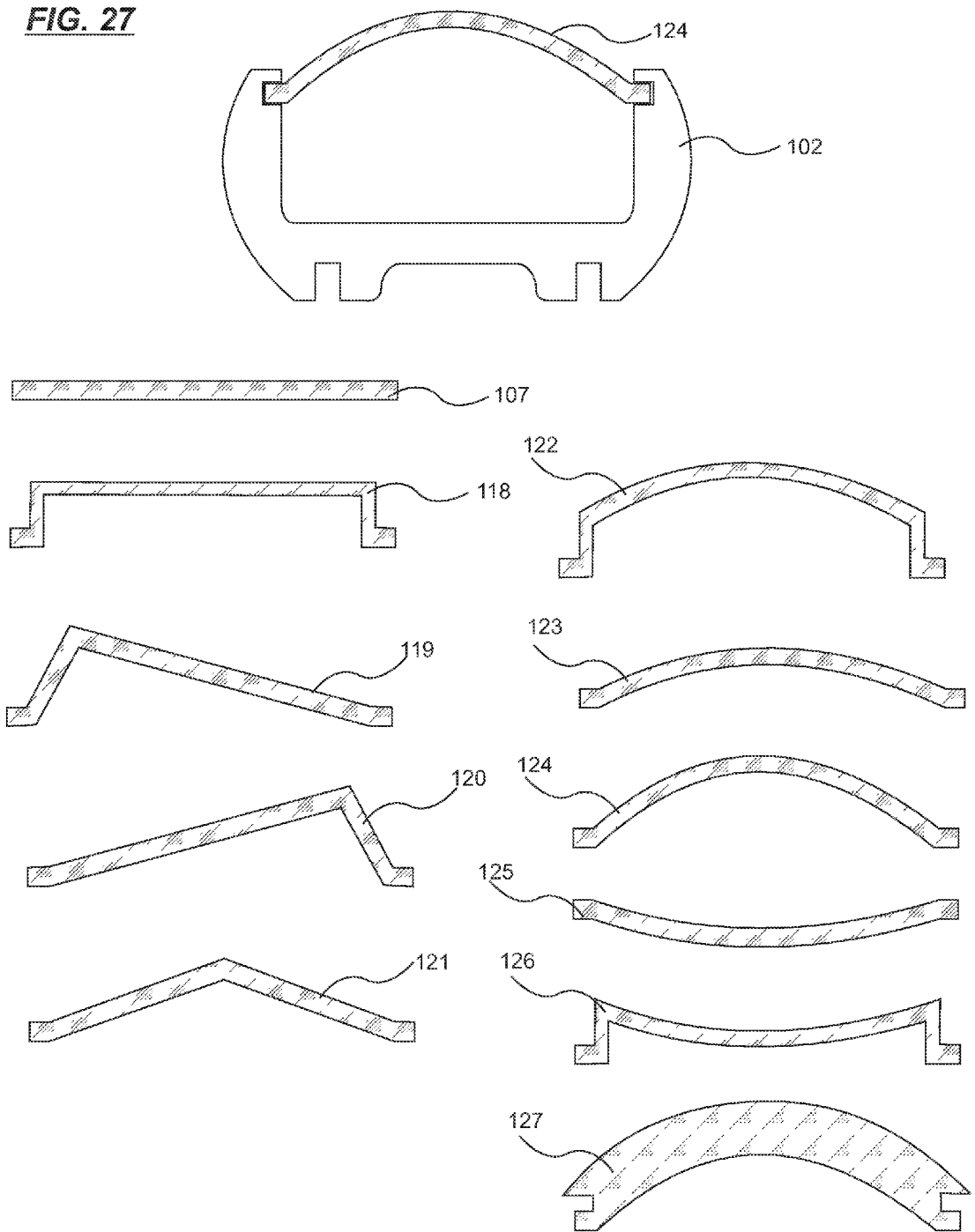
FIG. 27 shows some examples of lenses for the LED lighting system.

FIG. 17 is an example of an LED lighting system or tube 10 in a mass transit application. A transit vehicle has a body or hull 303 with a windshield 300. The break away shows floor 304, with seating 306 and partitions 305. Lighting tubes 10 may be installed in pre-existing fluorescent light sockets or receptacles 309, with bypassing or removal of the fluorescent light ballasts 308. FIG. 26 is another view of the mass transit application, showing also passengers 310 and a reading plane 311 and floor plane 313, which acts as a test zone for establishing whether the LEDs are providing sufficient illumination. FIGS. 18, 19 and 20 illustrate an application in which the LED lighting system 10 is used as part of an advertising sign 401 for a taxi 400. FIGS. 21, 22 and 23 illustrate an application in which the LED lighting system 10 is used as part of an on duty sign 404 for a taxi 400. FIGS. 24 and 25 illustrate installation of the LED lighting system 10 in new or pre-existing fluorescent light fixtures of an aircraft with a fuselage 500, seating 501, windows 502, upper luggage compartment 503, cargo area 504 and floor 505.

Figure 28:
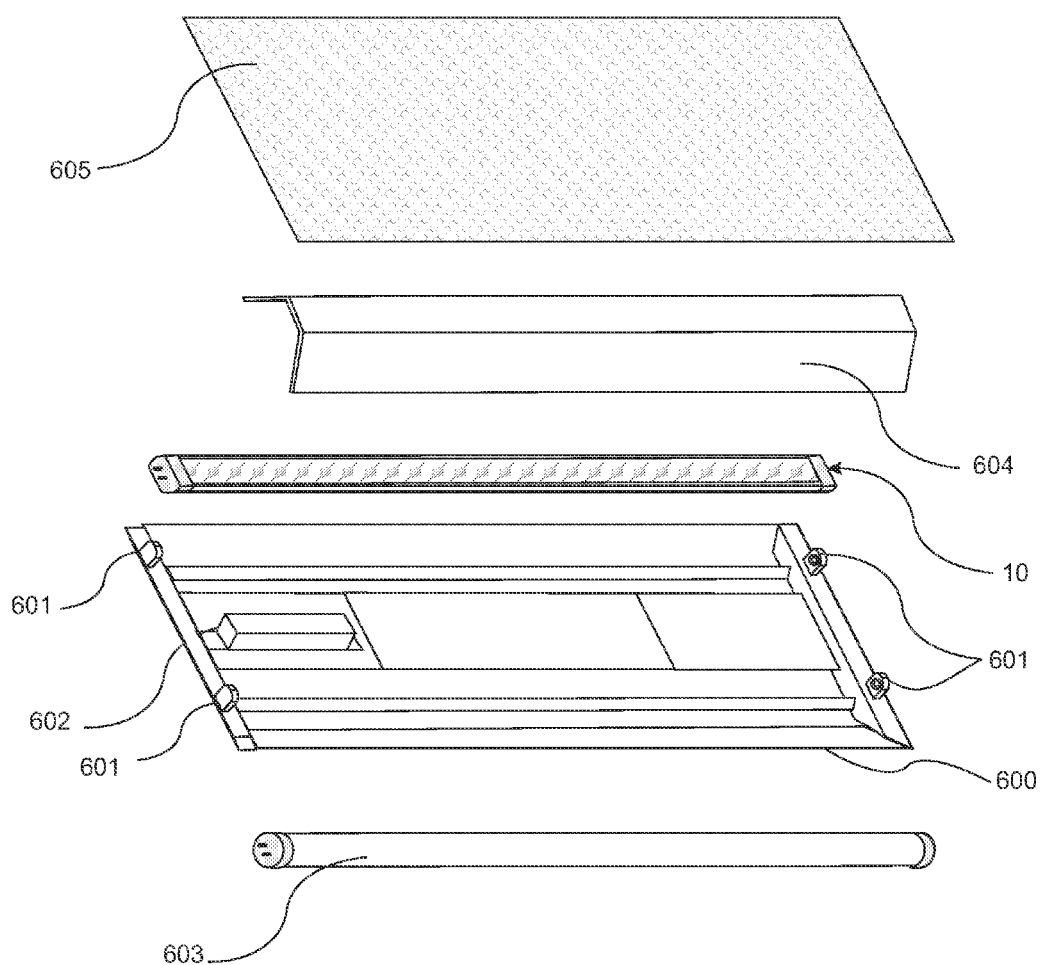
FIG. 28 shows an LED lighting system in a fluorescent lamp, replacement, retrofit, or new installation.
Figure 37:
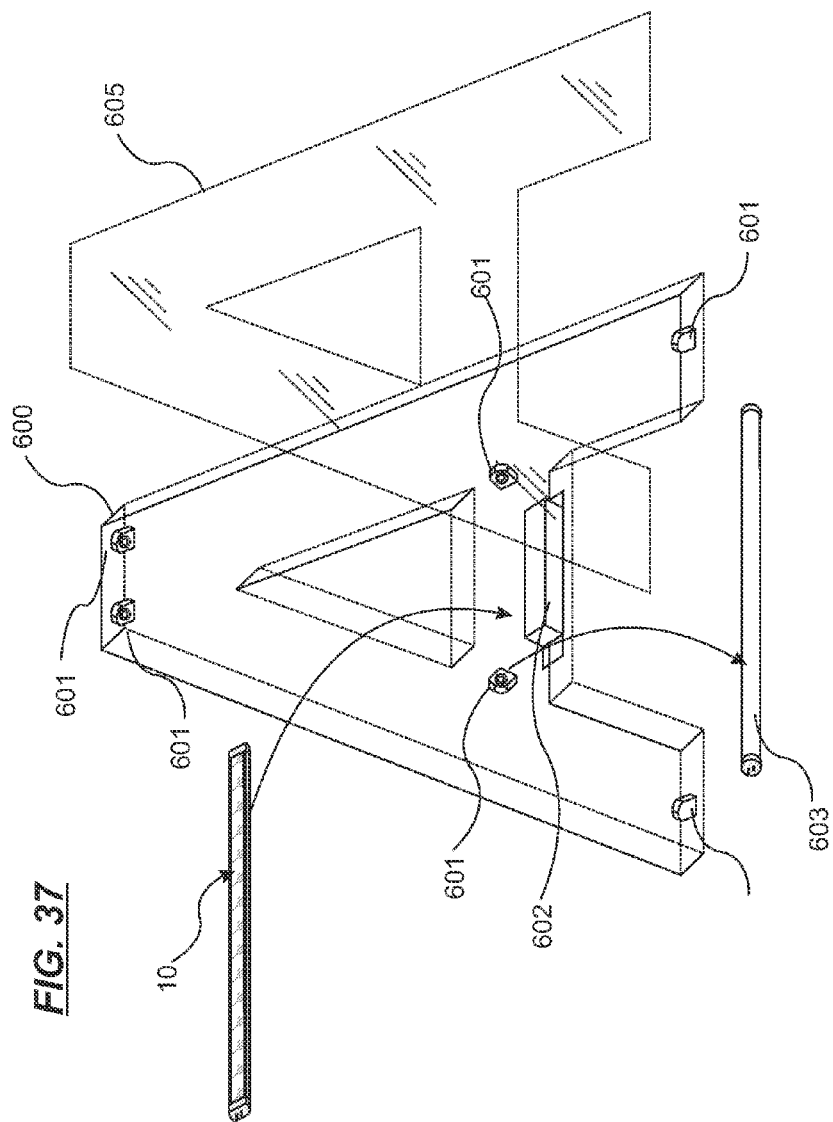
FIG. 37 is a signage application, with a view of replacement of fluorescent lamps in signage.

In FIGS. 27A-27K, various shapes of cover lens 107 are shown including moderate convex 124, straight 107, straight raised 118, asymmetrically peaked 119 and 120, symmetrically peaked 121, raised dome 122, low dome 123, convex 124, depressed low dome 125 raised convex 126, and low dome with channel enclosing 127. FIG. 28 shows a fluorescent lamp fixture 600 with power receptacles or sockets 601, conventional ballast 602 for lamp 603, replacement LED lighting tube 10, ballast cover 604 and diffuser panel 605. While the lens 107 is not required for the final assembly it can be added to act as a guard against vandalism, as a dust/dirt guard, as a light enhancing device, as a light directing/focusing device, as a moisture/waterproofing device (sealing unit completely with the addition of sealant) or as a light diffuser. In FIG. 28, only the lighting tube 10 is new. FIG. 37 shows replacement of a fluorescent lamp 603 in a display sign application with an LED lighting tube 10 that fits between power receptacles 601. The ballast 602 may be removed or bypassed.

Figure 29:
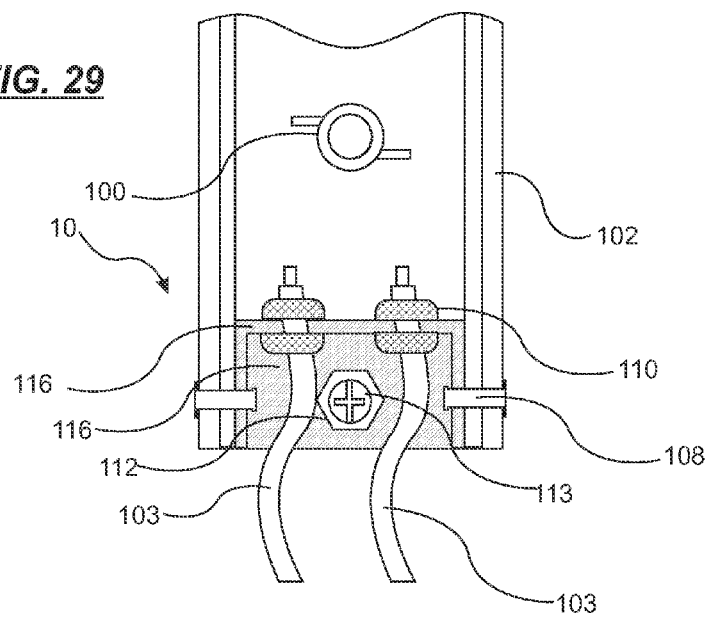
FIG. 29 is a top view of vehicle application LED lighting system, powered end.
Figure 30:
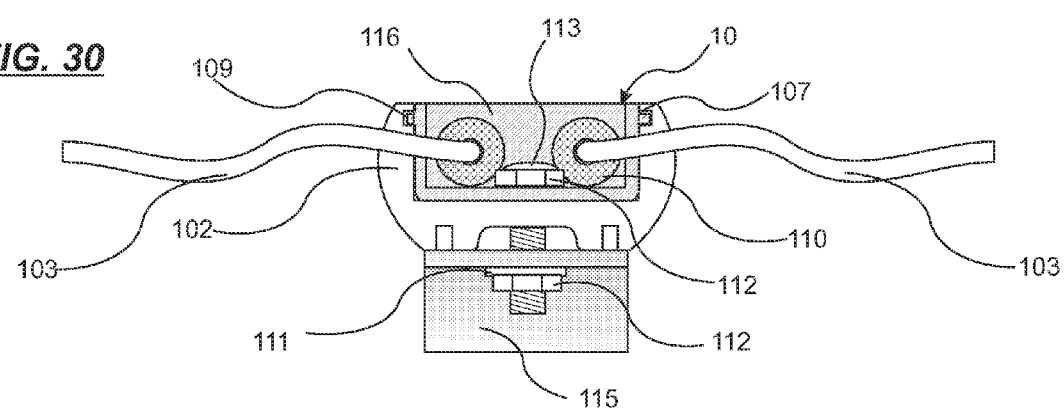
FIG. 30 is an end view of vehicle application LED lighting system, powered end.
Figure 31:
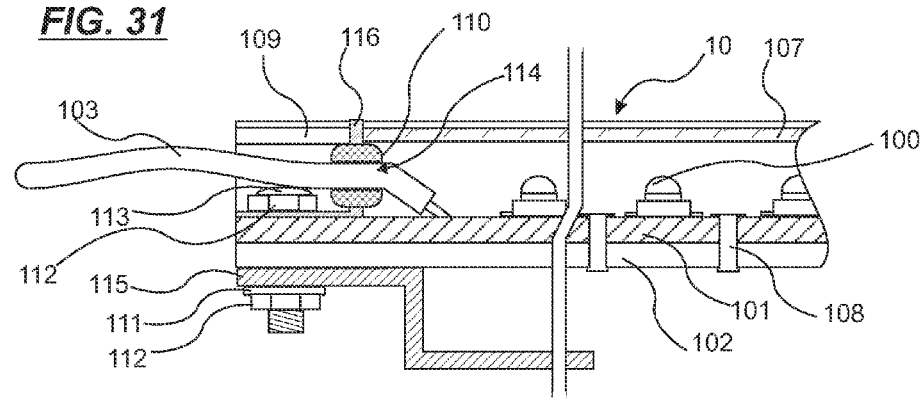
FIG. 31 is a cross cut view of vehicle application LED lighting system, powered end.
Figure 32:
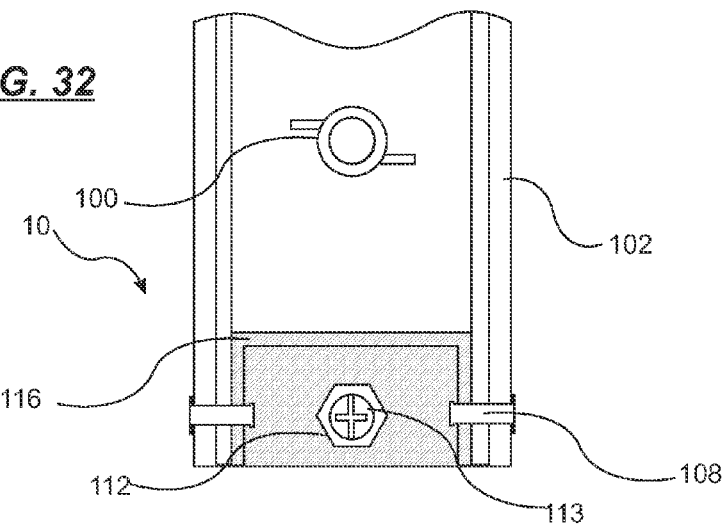
FIG. 32 is a Top view of vehicle application LED lighting system.
Figure 33:
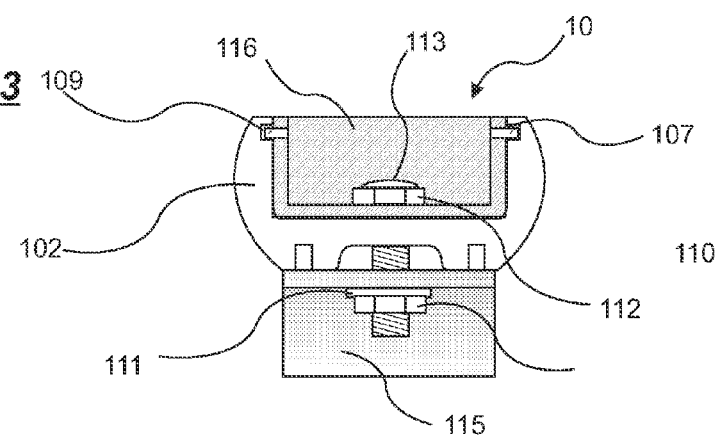
FIG. 33 is an End view of vehicle application LED lighting system.
Figure 34:
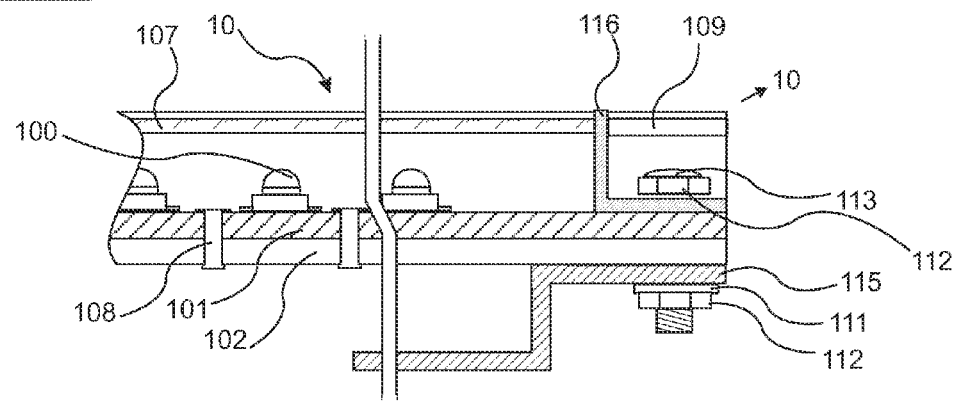
FIG. 34 is a cross cut view of vehicle application of LED lighting system.

In FIGS. 29-31, powered end of an LED lighting tube for a vehicle application includes LED 100 (one of several in the array), support structure 102, connecting wires 103 that connect to the circuit board 101 and rivets 108 for securing the circuit board 101 on the support structure 102. The connecting wires 103 pass through the holes 114 in O-rings 110 that are secured to the upstanding flange of an inner mounting bracket 116. The mounting bracket 116 is secured to the support structure 102 by a bolt 113 secured with nuts 112 and washer 111. Bolt 113 and nuts 112 also secure outer mounting bracket 115 to the support structure 102. Rivets 108 also secure the side walls of the mounting bracket 116 to the channel walls of the support structure 102. Mounting bracket 115 is used to connect the LED lighting tube of this embodiment to a structural portion of a vehicle. FIGS. 32-34 show the non-powered end of the LED lighting system for a vehicle, which is the same as the powered end except that there are no power connections.

Figure 35:
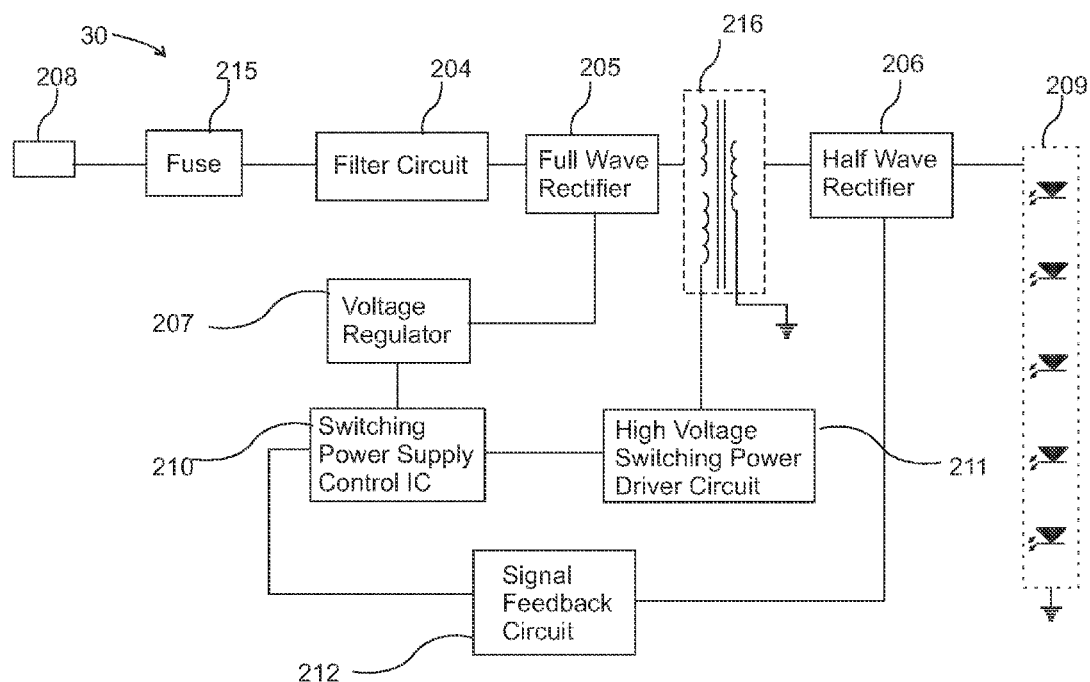
FIG. 35 is a block diagram of current control electronics for a high voltage application, single series (73V~240V)
Figure 36:
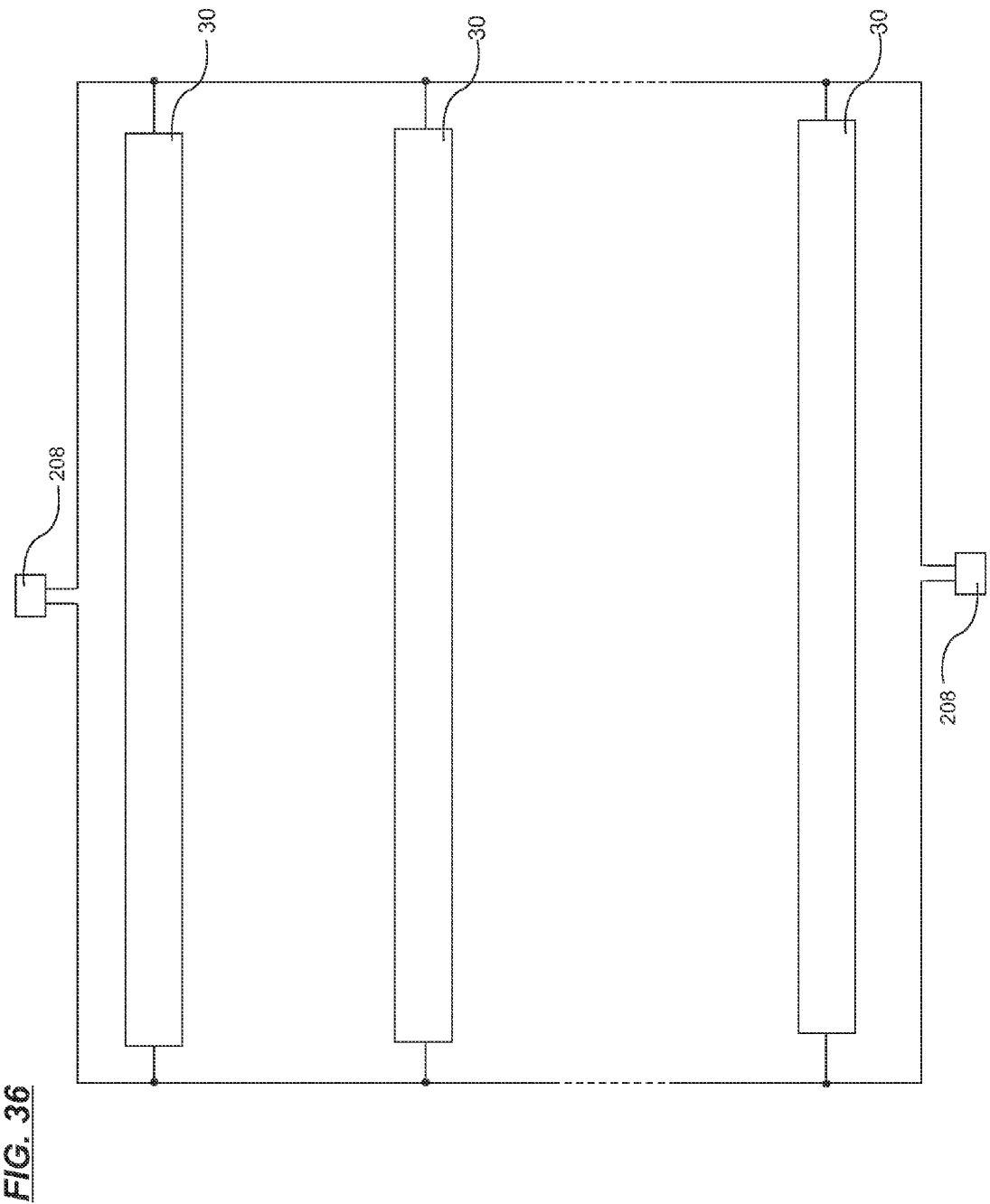
FIG. 36 is a block diagram of current control electronics for high voltage application, multiple series (73V~240V)

FIG. 35 shows electrical circuitry 30 of an current circuit, and FIG. 36 shows several such boards connected in parallel between respective power buses. FIGS. 35 and 36 show circuitry for a high voltage power source, above 72 volts, for example 120 volts to 240 volts, either AC or DC. The example shown here is for AC power supply. Fuse 215 protects the circuitry of the board from power surges. The fuse can be permanent or be a resettable fuse. Bi-directional filter circuit 204 filters out noise. Full wave rectifier 205 transforms AC current from the power bus (left side of figure) to DC current. The DC current from the full wave rectifier 205 is supplied to voltage regulator 207 to step the voltage down to a low level, for example 5 volts, to power switching power supply control IC 210. The switching power supply control IC 210 provides a modulated signal at about 250 kHz or more that determines the switching frequency or pulse width of a high voltage switching power driver circuit 211. The switching signal from driver 211 drives a primary coil of transformer 216, and causes DC voltage supplied by the full wave rectifier 205 to switch at the switching frequency or pulse width determined by the control IC 210. Transformer 216 couples this switching voltage through half-wave rectifier 206 which also filters the high frequency signal from the transformer 216 to the LED array 209 on the right side of FIG. 35. The half-wave rectifier 206 provides the switching frequency or pulse width of the current from the secondary of the transformer 216 and supplies a isolated feedback signal through a signal feedback circuit 212 to control IC 210. Depending on whether the sensed signal is above or below the desired current level, the control IC 210 varies the pulse width or pulse frequency of the signal driven by the driver circuit 211 to ensure a constant average current supplied to the LEDs. The transformer 216 both isolates input from the output, which drives the LEDs, and provides a voltage step down from high voltage above 72 volts, to low voltage required by the LED array 209. The control IC 210 may also be configured to vary the average current supplied to the LEDs, by suitable controlling the pulse width or frequency of the drive signal to the circuit 211, and thus provide a dimmable controller that can be used to control the brightness of the lighting devices. The switching power supply circuit 30 may be mounted on each circuit board 101, or shared by each of several circuit boards 101 and located at one end of the lighting device 10.

The switching power supply circuit 30 is integrated with the LEDs 100 on each section of printed circuit board 101, so that any defect of each power supply circuits or LEDs 100 would not affect the lighting device 10 as a whole. The other circuit boards 101 of the lighting device are still active. The LED lighting device 10 can be installed in polarity or no polarity, and may have any required length. The LED lighting device 10 may use voltages from 1.5V~240V in both DC and AC, and may fit retroactively into existing fluorescent lighting fixtures after removing or bypassing the ballast. This LED lighting device 10 can be a replacement or retrofit for all existing fluorescent lighting tubes larger than the size of T5.

FIG. 38 and FIG. 39 show two different views of an embodiment of an LED lighting system in which the LEDs 100 lie on flat PCB heat sinks 134. The LED arrays are attached to the flat PCB heat sinks with each of the LED arrays facing in a different direction. Each LED array contains a series of LEDs, each with a conical beam, that together create an illumination field. The orientation of the illumination fields of the LED arrays shown in FIGS. 38 and 39 are angularly offset from each other by 90 degrees. In other embodiments, this angle may change, and/or individual LEDs may have conical beams that are angularly offset from each other. Additional LED arrays may also be provided, with each LED array having a differently oriented illumination field. In one embodiment, the illumination fields of three or more LED arrays may together make up a 360 degree pattern. In the embodiment of FIGS. 38 and 39, an 180 degree lens 133 with guides is attached to the support structure 136 in channel 109, and may slide into place along the channel 109. In FIG. 39, two PCB heat sink slots 135 are formed in the support structure 136. The heat sinks 134 fit in the slots 135. Heat from the heat sinks 134 is in part conducted to the support structure 136 to assist in heat dissipation. A suitable heat conductive material such as aluminum may be used for the heat sinks 134 and support structure 136.

Figure 40:
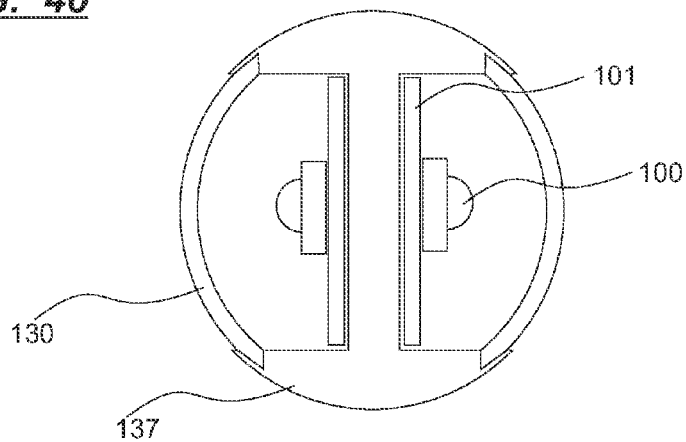
FIG. 40 is a section through a embodiment of an LED lighting system with 360 degree coverage.
Figure 41:
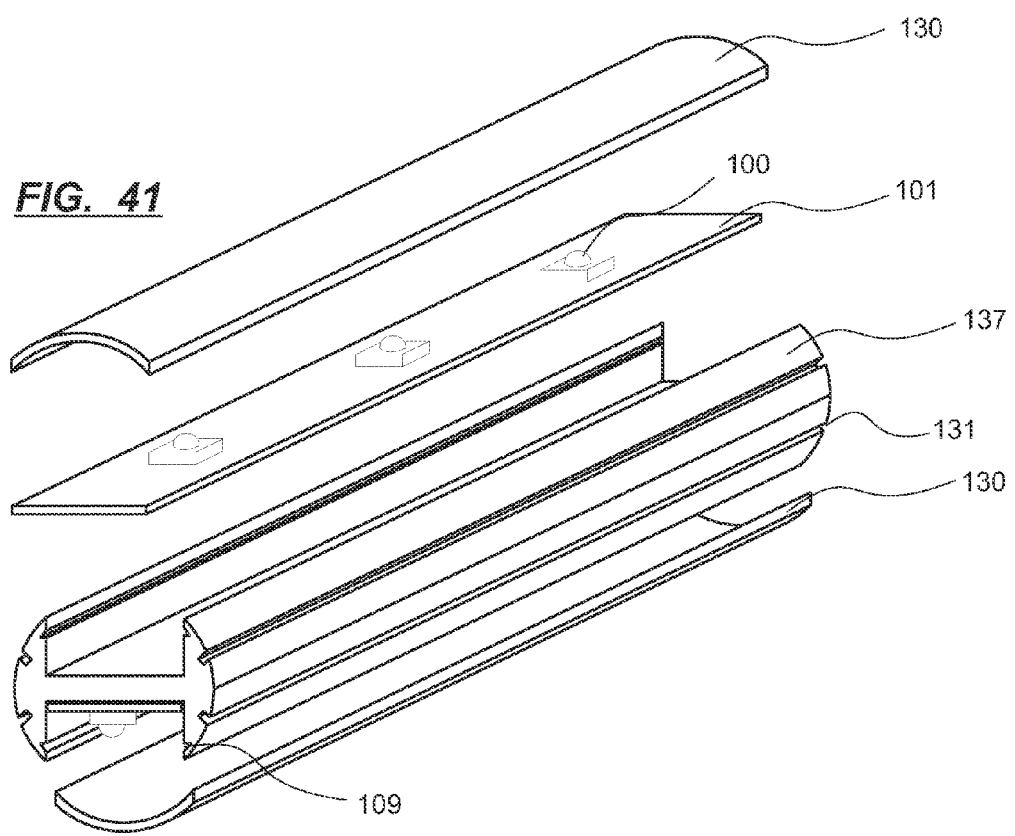
FIG. 41 is an exploded view of the embodiment of FIG. 40.
Figure 51:
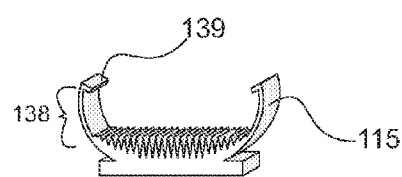
FIG. 51 is a perspective view of a mounting bracket that may be used with the embodiments of for example FIGS. 46-49.
Figure 52:
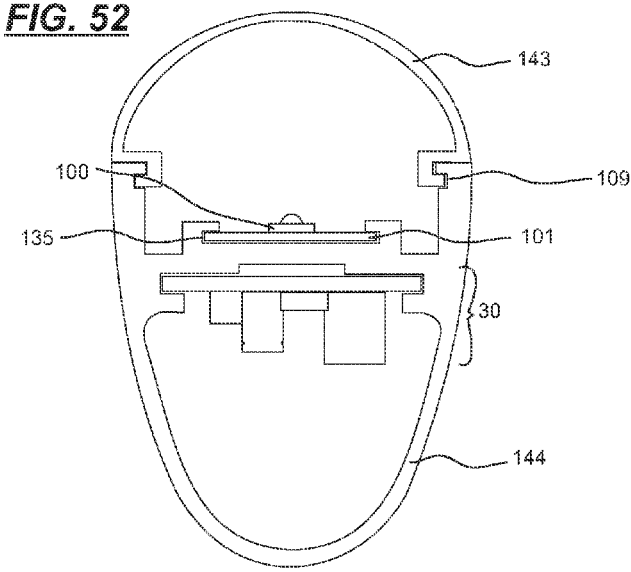
FIG. 52 is a section through an embodiment of an LED lighting system with a domed support structure.
Figure 53:
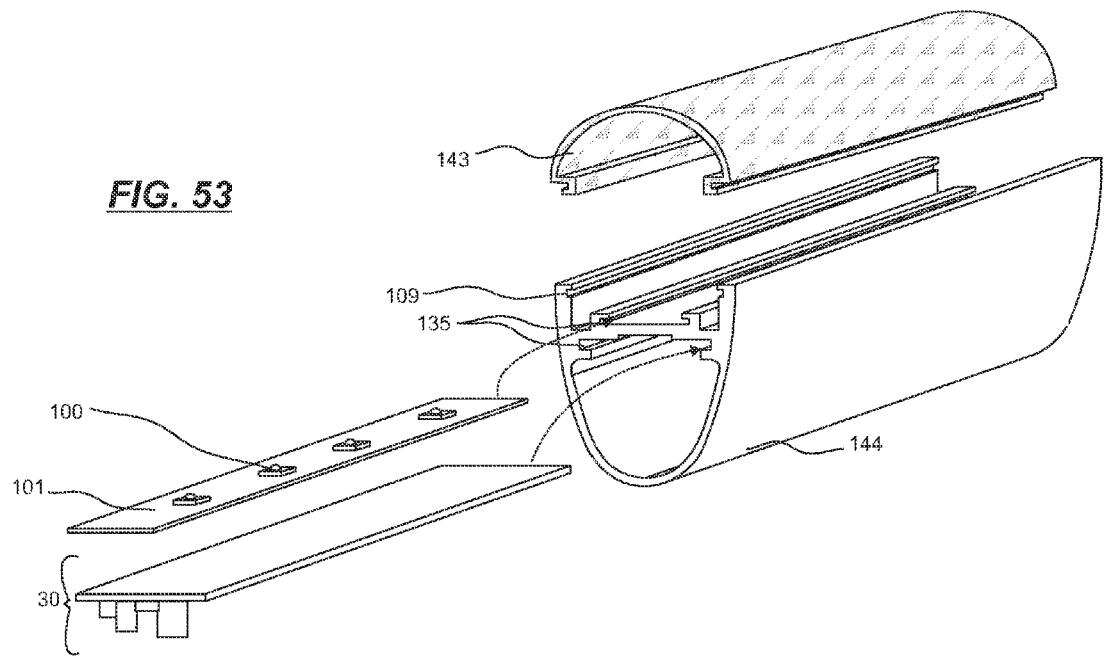
FIG. 53 is an exploded view of the embodiment of FIG. 52.

FIGS. 40 and 41 show a further embodiment of an LED lighting system with 360 degree coverage in which the support structure 137 defines two channels and the LEDs 100 of two LED arrays on circuit boards 101 have illumination fields at 180 degrees to each other. A double sided lens 130 is received in channel 109 in the support structure 137. Grooves 131 on the outside of the support structure are provided for receiving a mounting clip such as mounting clip 115 shown in FIG. 51. Mounting clip 115 has arms 138 with hooks 139 that insert into the grooves 131. The clip 115 may be secured by any suitable means to the structure 137 such as a part of the surface to which it is mounted.

Figure 42:
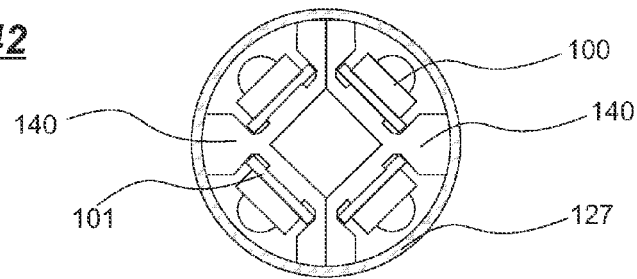
FIG. 42 is a section through a further embodiment of an LED lighting system with 360 degree coverage.
Figure 45:
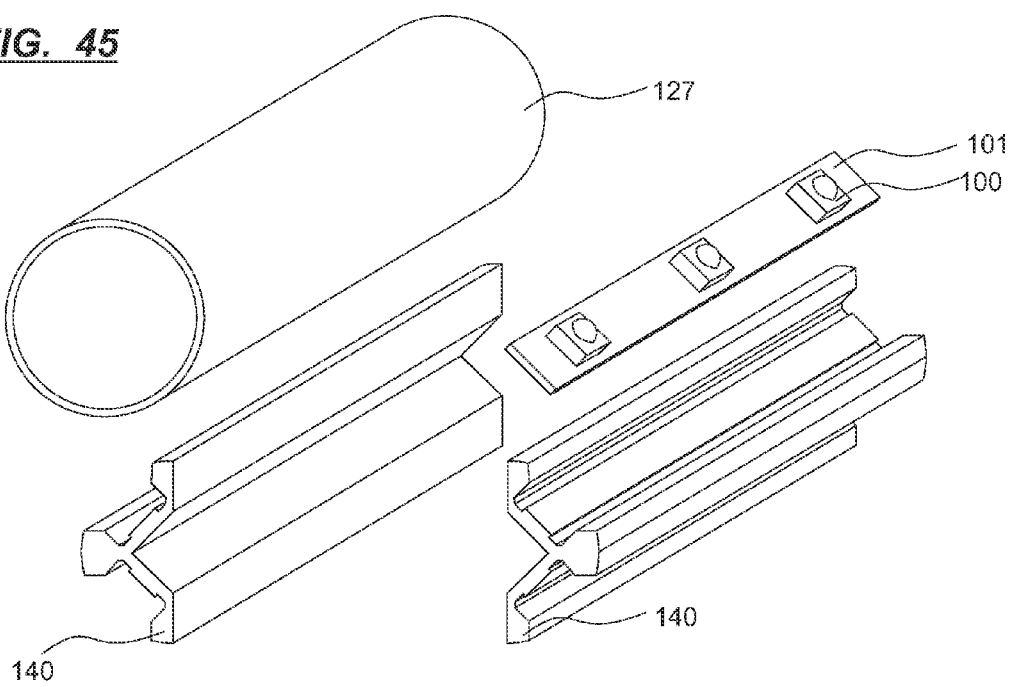
FIG. 45 is an exploded view of the embodiment of FIG. 42.
Figure 46:
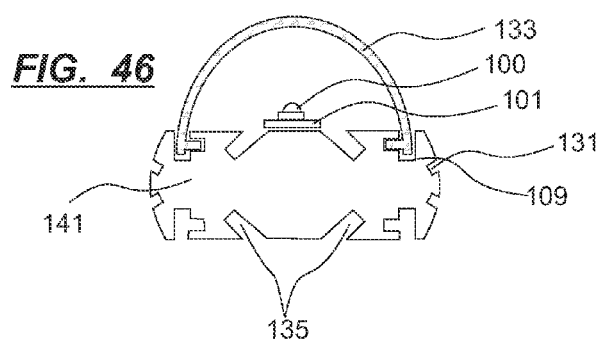
FIGS. 46-49 are a series of sections of an LED lighting system showing how various configurations of LED arrays may be carried by a support structure.
Figure 47:
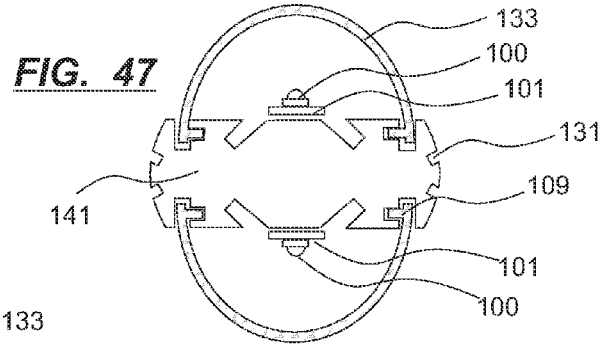
Figure 48:
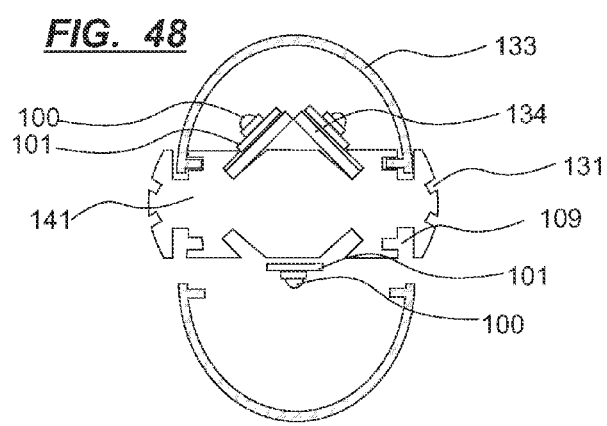
Figure 49:
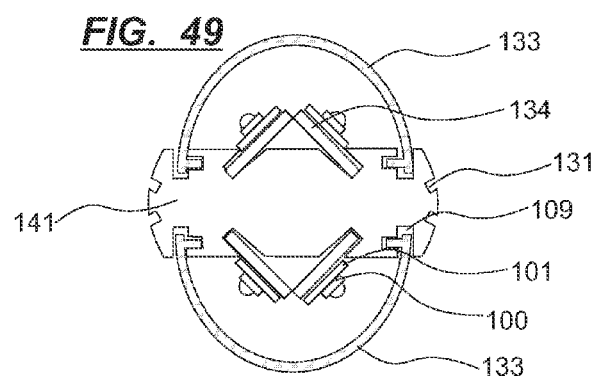
Figure 50:
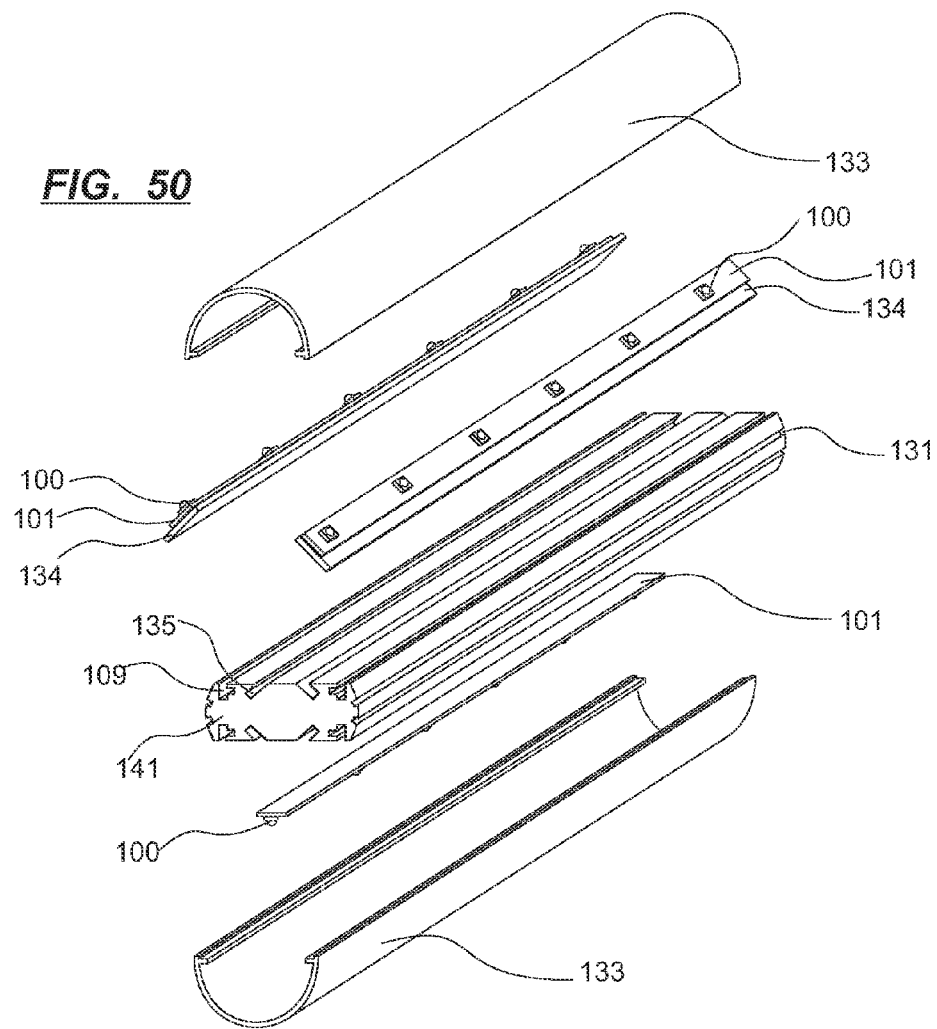
FIG. 50 is an exploded view of the embodiment of FIG. 48.

FIGS. 42 and 45 show a further embodiment of an LED lighting system with 360 degree coverage similar to the design of FIG. 66, but the lens covers 129 are omitted, and the locking elements 128 are also omitted, the cylindrical lens 127 being used to secure the elements together.

Figure 43:
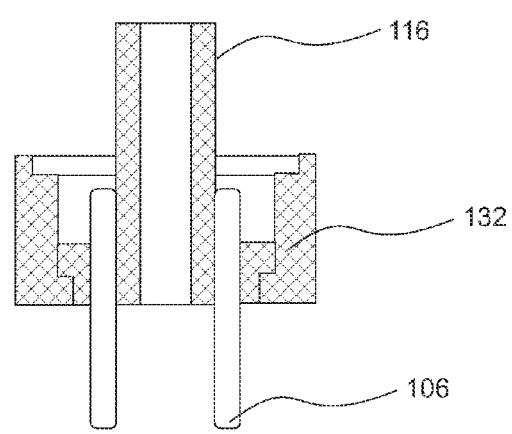
FIG. 43 is a section of an end socket for use with an LED lighting system.
Figure 44:
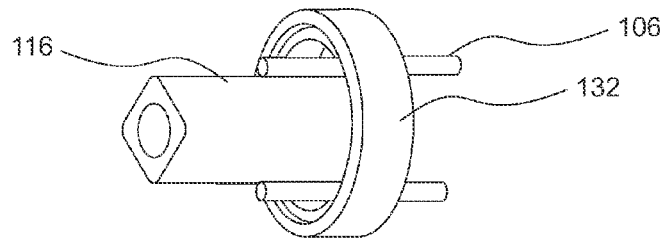
FIG. 44 is a perspective view of the embodiment of FIG. 43.

FIGS. 43 and 44 shows an end socket for use with an LED lighting system 10 which uses two pins 106 secured within an inner mounting channel 116 inside an end cap channel 132. This end socket may be used with the designs of hollow support structures (or at least partially hollow) such as those of FIGS. 42, 45, 66 and 67 with the channel 116 protruding into the hollow support structure 140 or 147.

FIGS. 46-50 show how various configurations of LED arrays may be carried by a support structure 141. In these figures, the support structure 141 is the same in each case, and may be provided with one or two semi-cylindrical lenses 133 received in slots 109 running along the length of the support structure 141. Mounting clip grooves 131 are provided on the outer sides of the support structure 141. There may be one (FIG. 46), two (FIG. 47), three (FIG. 48) or four (FIG. 49) circuit boards 101 carrying LEDs 100 in linear arrays that may be directly secured to the support structure 141 or placed on flat PCB heat sinks 134 that are received in angled slots 135 running along the length of the support structure 141. In this way, the orientation and number of the LED arrays can be selected according to the application.

Figure 59:
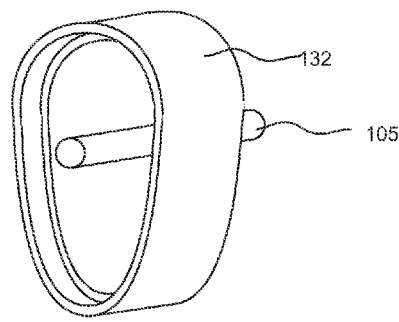
FIGS. 59-65 show a variety of end sockets for use with LED lighting systems.
Figure 60:
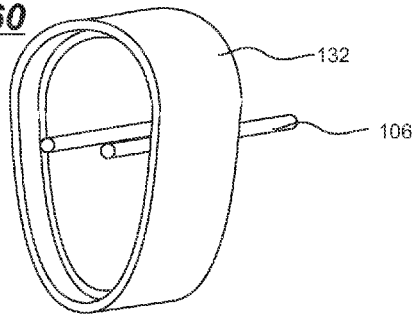
Figure 61:
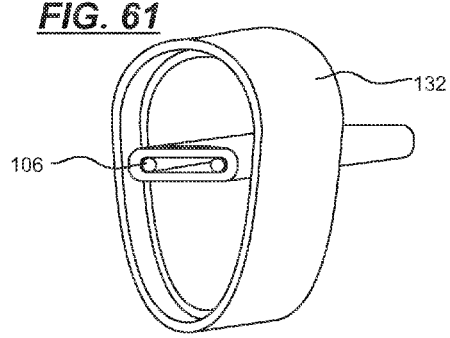
Figure 62:
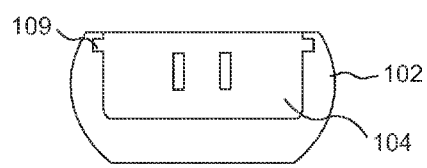
Figure 63:
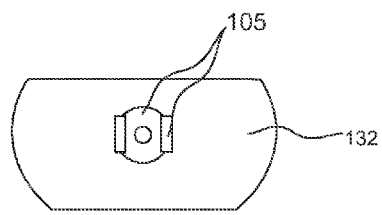
Figure 64:
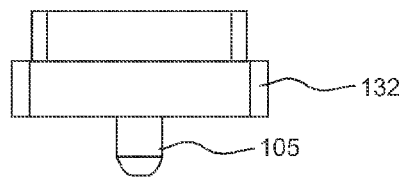
Figure 65:
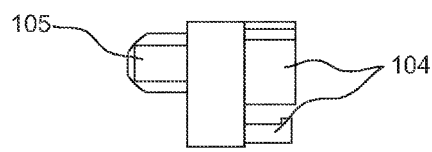

FIGS. 52-55 show a variety of LED lighting systems with a domed support structure 142 and 144. A 180 degree lens 143 has guides that are received in grooves 109 in the support structure 142 and 144. An LED array formed of LEDs 100 on circuit boards 101 in one 180 degree embodiment (FIG. 52) is received in slots 135 on the front side of the support structure, and on the opposite rear side a power supply 30 may be secured by any suitable means within the domed portion of the support structure 142 and 144. In another embodiment (FIG. 54), the LEDs of respective circuit boards 101 have illumination fields that are oriented at different angles, though both illumination fields are perpendicular to the direction of elongation of the support structure. The direction of the illumination field is the direction perpendicular to the light emitting surface of the LEDs 100. The embodiments of FIGS. 52-55 may be connected to fixtures by end cap channels 132 as for example shown in FIGS. 59-61.

FIGS. 56 and 57 show further embodiments of an LED lighting system with differently angled LED arrays. In this embodiment, the support structure 145 may be mounted by clips with lips that are received in grooves 131. The embodiment of FIG. 58 is an example of an LED lighting system with 360 degree illumination field generated by four LED arrays at angles to each other, with semi-cylindrical lenses 133, and also that may be mounted on a mounting clip.

FIGS. 62-65 show a variety of end sockets for use with LED lighting systems, showing support structure 102, end cap 104, pin connector Type 1 105, and end cap channel 132.

FIGS. 66 and 67 show an embodiment of an LED lighting system with 360 degree coverage. In this embodiment, there are four LED arrays each secured to one piece of a two piece hollow support structure 147. In this example, the support structure 147 forms four channels at the base of which circuit boards 101 holding the LEDs 100 are fixed by any suitable means. The four channels are defined by four arms of the support structure 147. Lens covers 129 are received in slots running the length of the arms and are provided with openings for the LEDs. The LEDs protrude into the openings. A cylindrical lens 127 surrounds the support structure 147. The two pieces of the support structure 147 are held together by locking elements 128.

Figure 68:
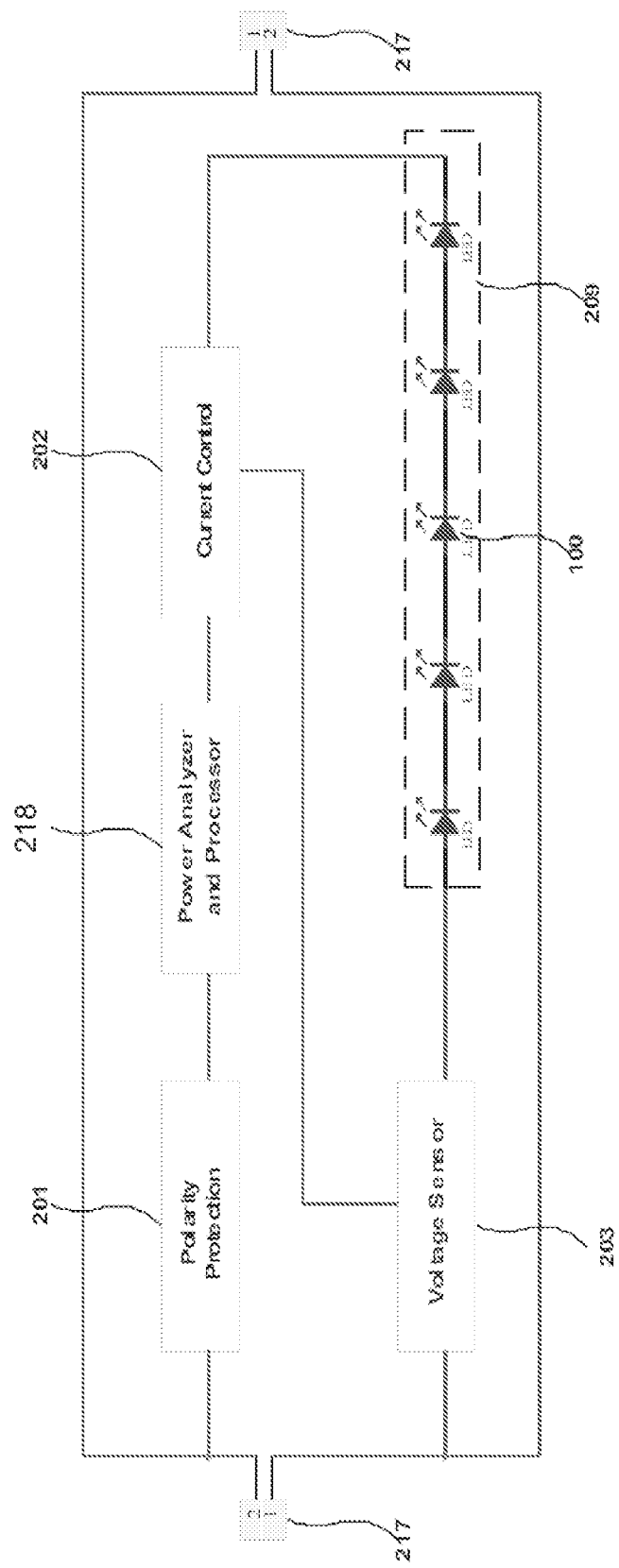
FIG. 68 is a block diagram of the main structure of an LED lighting system, which has a 2-wire power source and power analyzing and processing circuitry.

FIG. 68 illustrates the main structure of a LED lighting system connected to a 2-wire power source 217.

A polarity protection circuit 201 of conventional design safeguards against the user installing the product in the wrong polarity.

The power source 217 may be AC or DC. The characteristics of the power source 217, such as voltage amplitude, power frequency and pulse width, can be adjusted.

The power analyzer and processor 218 connects to the power source 217 and analyze the characteristics of power source 217 such as the voltage amplitude, power frequency and pulse width. Then the power analyzer and processor 218 compares one or all of these characteristics to the preset control criteria, which could be realized by hardware or software or both. According to the comparison results, the power analyzer and processor 218 controls the current control circuit 202 to adjust the function of LED arrays 209.

This method is different from the common ways used for the LED lighting control. Traditionally to control the LED lights a control signal has to be provided to the lights either through a separated control pin or wire, or wireless technology, or technologies like signal carrier, or the technology in a master-slave mode. When the LED lights work in master-slave mode the LED arrays are controlled by the power source directly. For example the power source's voltage is applied to the LEDs directly, so the LEDs are lit up when the voltage goes up and dim down when the voltage goes down. In our invention the power source is not applied to the LEDs directly. The power source's characteristics, such as voltage amplitude, will be compared to the preset value. The light is controlled according to the comparison results. It is possible the light is lit up when the input voltage goes down, which is totally different from the traditional way. In this way the LED lights can be more conveniently controlled by controlling the characteristics of the power source.

As shown in FIG. 68, the LED array is divided into sets 209 of LEDs, for example five LEDs per set. The current control circuitry 202 is configured to provide constant current to the LEDs 100 of the LED array 209. As an example, the current control circuit 202 may use pulse width modulation (PWM) to control the current supplied to the LEDs. The circuit 202 supplies constant, controlled, current to unit for the entire LED set 209 with information from voltage sensor 203. The voltage sensor 203 receives current information from LEDs 209 and feeds back information to the current control circuitry 202. For example, in the use of PWM, the voltage sensor 203 converts the current of LED array 209 to voltage signal and supplies the voltage signal to the current control circuit 202. The current control circuit 202 senses how much the detected voltage varies from the desire varying the pulse width or frequency, changes the current supplied to the LEDs towards the desired level.

Figure 69:
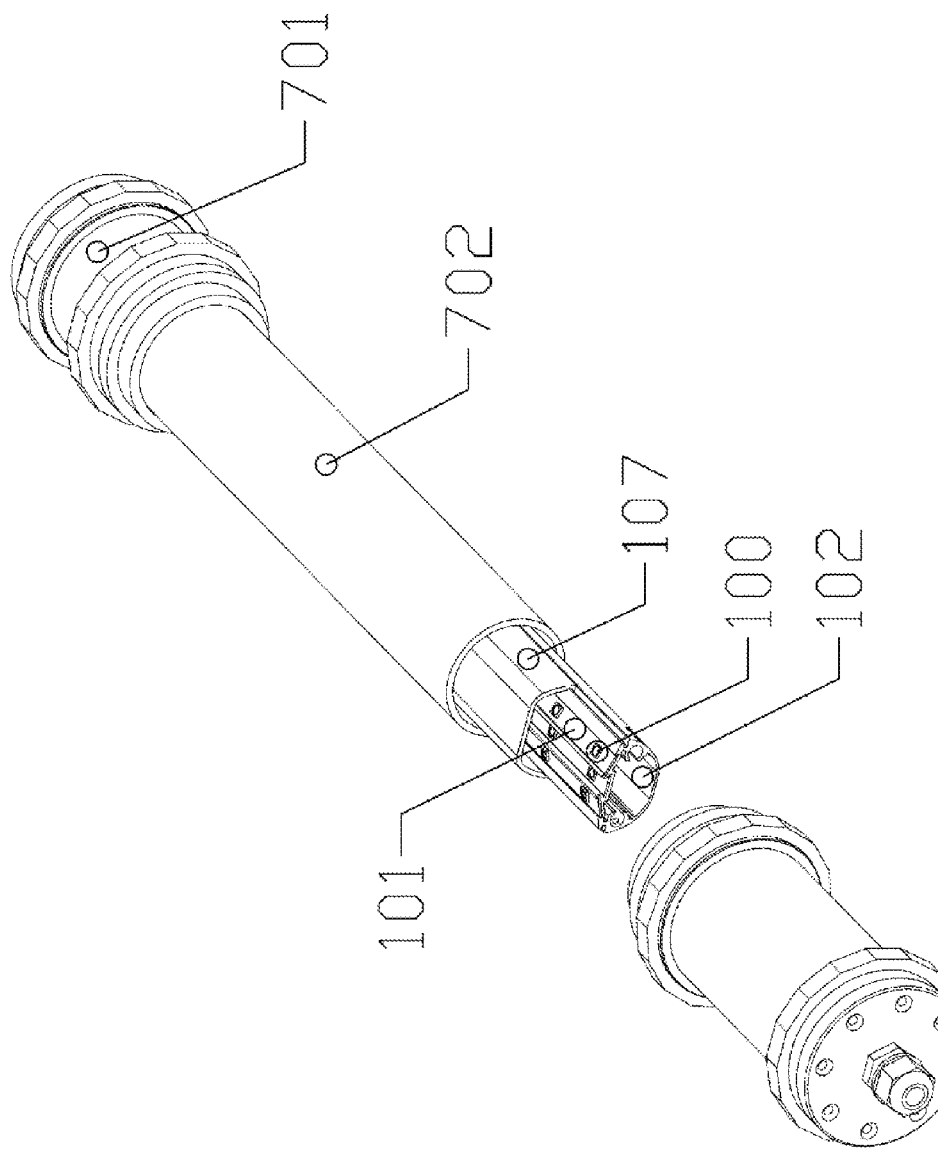
FIG. 69 is a 3-D view of a LED lighting system with two handles and 3 rows of LEDs.
Figure 70:
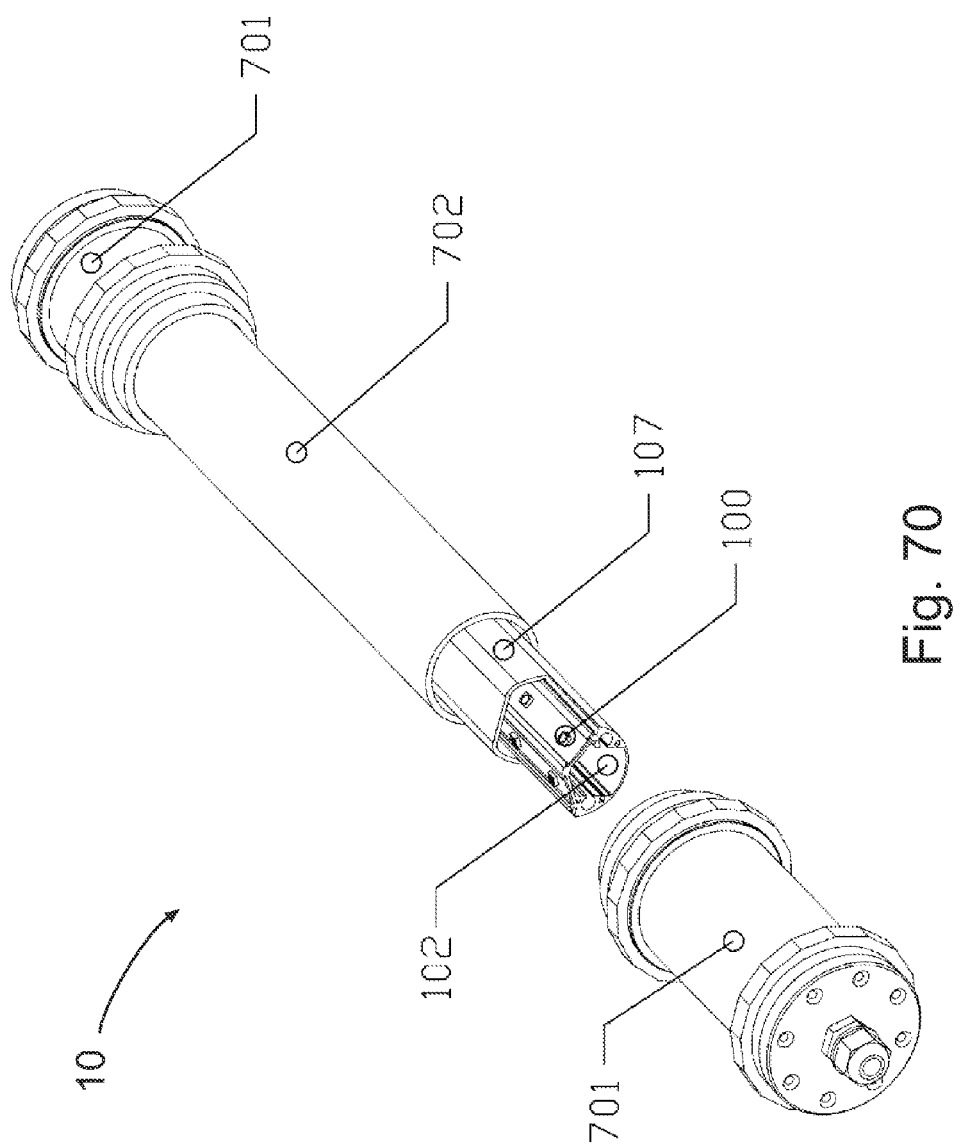
FIG. 70 is a 3-D view of a LED lighting system with two handles and 2 rows of LEDs.

FIG. 69 shows an embodiment of an LED lighting system 10 with two handles 701. Handles 701 are made of metal and/or plastic materials to help the heat dissipation and reduce the shock and vibration. The circuit boards 101 are installed on the housing 102. The Housing 102 is made of heat conductive and rigid material. Cover lens 107 is mounted on the housing 102. It can be transparent or translucent. External lens 702 is a tube made of various materials such as Polycarbonate. Mostly the external lens 702 is clear. It is used to provide water proof and/or anti-explosion features. In this embodiment three rows of LEDs 100 are installed at different angles to provide wider viewing angle. Each row of the LEDs 100 might have different colors, which can be turned on at the same time or individually to provide desired features. In another embodiment, shown in FIG. 70, the shape of the housing 102 can be changed to hold one or two rows of LEDs 100 to provide different angles and functions.

Figure 71:
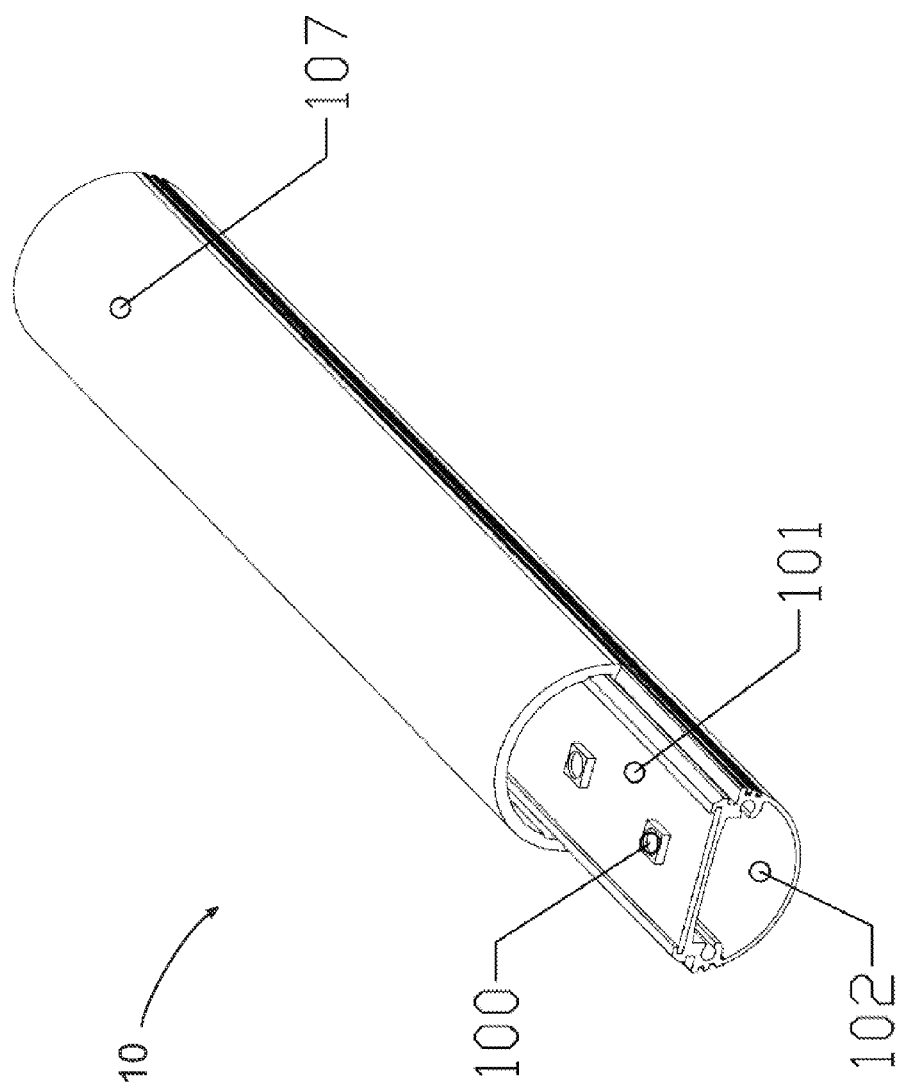
FIG. 71 is a 3-D view of a tube LED lighting system, without end fitting.

FIG. 71 shows a tube embodiment of an LED lighting system 10. The housing 102 is made of heat conductive material. The cross section of the housing 102 is a closed half circle. The circuit boards 101 with LEDs 100 are installed on the housing 102. The housing 102 helps to dissipate the heat from the circuit board 101. The cover lens 107 is in a shape of half circle to be mounted on the housing 102. The whole assembly forms a tube like traditional fluorescent light.

Figure 72:
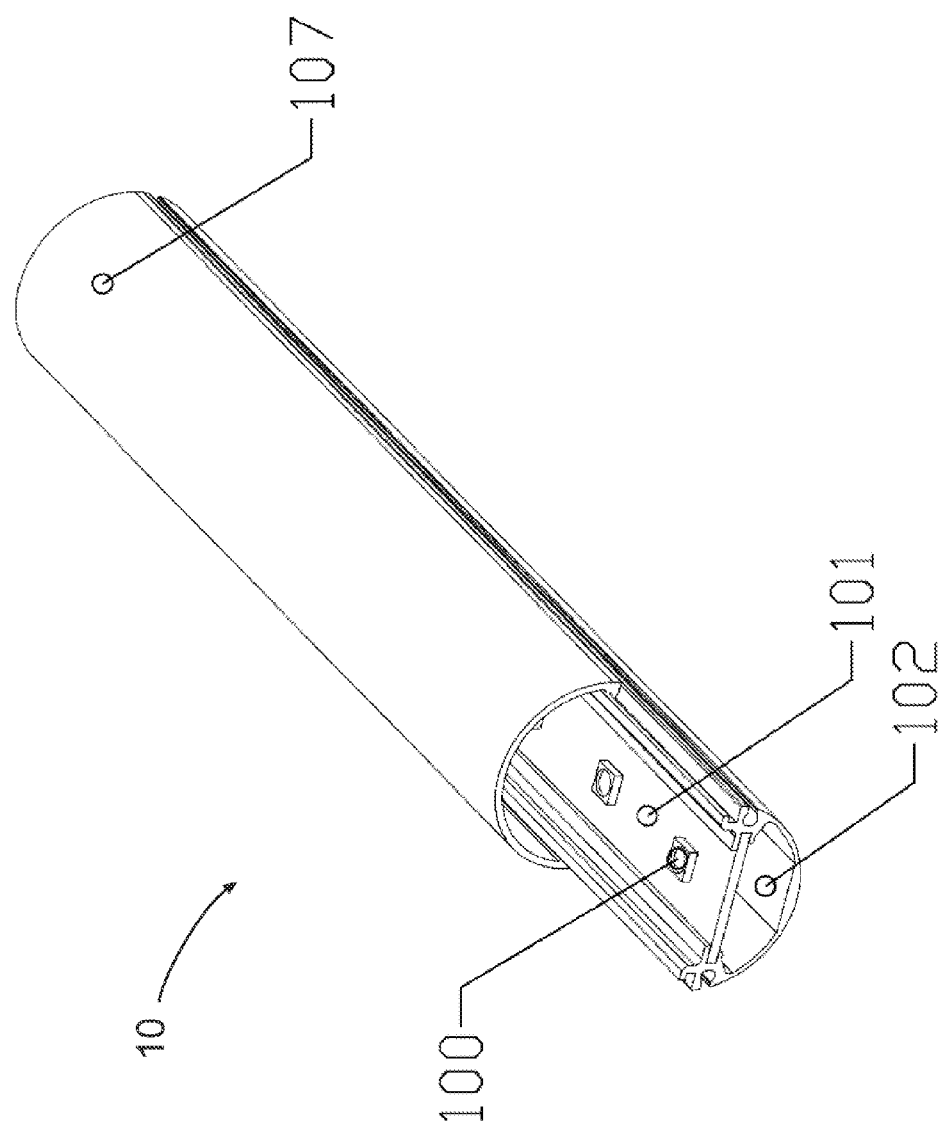
FIG. 72 is a 3-D view of another embodiment of a tube LED lighting system, without end fitting.

FIG. 72 shows another tube embodiment of the LED lighting system 10. The housing 102 in this embodiment has a tube shape with an unclosed half circle section, so a double-sided circuit board 101 can be installed on the housing 102. The cover lens 107 has same features as in FIG. 71.

Figure 73:
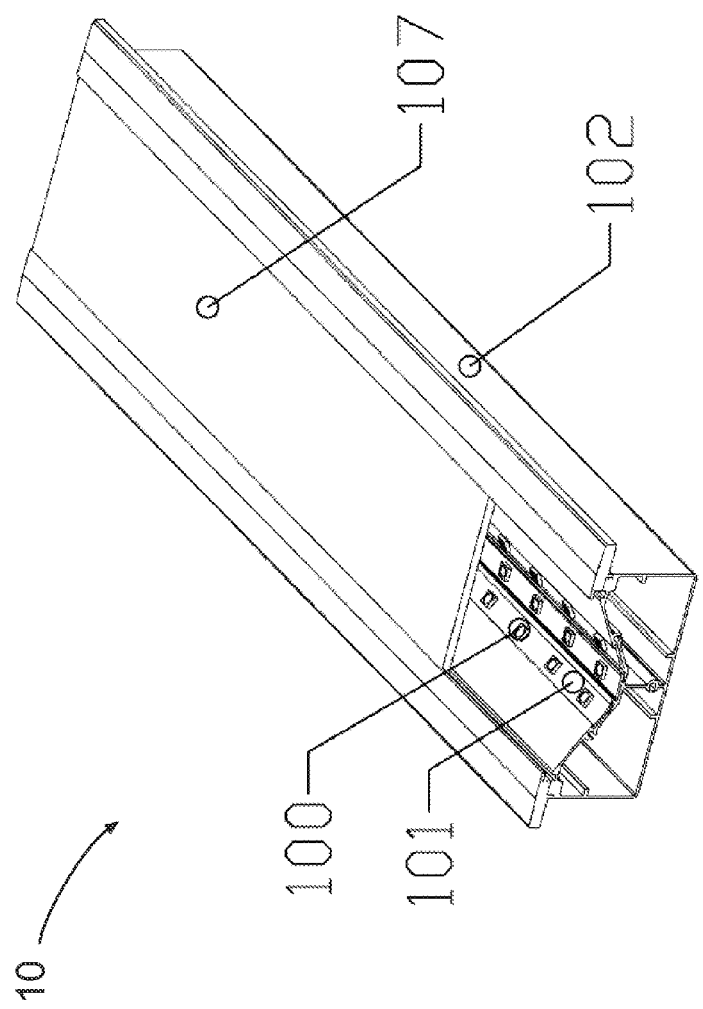
FIG. 73 is a 3-D view of a rectangle LED lighting system, without end fitting.

FIG. 73 shows a rectangle embodiment of LED lighting system 10. The housing 102 is made of heat conductive and rigid materials. The circuit boards 101 with LEDs 100 are installed on the housing 102. Three rows of LEDs 100 are installed at different angles to provide wider viewing angle. The cover lens 107 is flat and installed on the housing 102. The whole assembly forms a rectangle. This lighting system can be applied in the recessed lighting applications.

FIG. 74 shows an embodiment of an LED lighting system 10, with housing 102, cover lens 107 and with LEDs 100 secured to a circuit board 101. This system has low profile to fit into desired applications.

Immaterial modifications may be made to the embodiments described here without departing from what is claimed.

What is claimed is:

1. An LED lighting system for connection to a variable power source providing input power, comprising:
    at least one LED array extending along a support structure spanning between a first end and a second end, the support structure made of rigid material, the support structure being sufficiently heat conductive to provide heat dissipation for LEDs in the at least one LED array;
    an electrical connector for connection to the variable power source at least at the first end or between the first end and the second end;
    power control circuitry for the at least one LED array, the power control circuitry being carried by the support structure and being in electrical communication with the electrical connector;
    a circuit board supporting the at least one LED array, the corresponding power control circuitry being provided on the circuit board or on a separate board;
    the at least one LED array being divided into sets of LEDs;
    the power control circuitry being formed of one or multiple current controllers, each of the one or multiple current controllers providing current control for a corresponding set of LEDs in the LED array; and
    at least one power analyzing and processing circuitry connecting to the variable power source and being configured to:
        identify one or more characteristics of the input power, where the characteristics are selected from amplitude, frequency, and pulse width of the input power,
        compare one or more of the characteristics of the input power to preset control criteria either in hardware or software or both to yield a comparison result, and
        control the current control circuitry according to the comparison result.

2. The LED lighting system of claim 1 in which each LED of the at least one LED array has a power rating of no less than 0.01 watts.

3. The LED lighting system of claim 1 further comprising:
    the support structure being generally elongated in a first direction;
    the at least one LED array having a first illumination field directed perpendicularly to the first direction; and
    at least one other LED array carried by the support structure, the at least one other LED array having a second illumination field directed perpendicularly to the first direction, the second illumination field being oriented at a non-zero angle to the first illumination field.

4. The LED lighting system of claim 3 in which first illumination field and the second illumination field are oriented at 180 degrees to each other.

5. The LED lighting system of claim 1 further comprising:
    the support structure being generally elongated in a first direction; and
    plural other LED arrays carried by the support structure, the plural other LED arrays being oriented to provide an illumination field that extends 360 degrees around the support structure at a given distance outward from the support structure.

6. The LED lighting system claim 1 in which the support structure has a front side on which the at least one LED array is carried and a rear side on which the power control circuitry is carried.

7. The LED lighting system claim 1 further comprising an electrical connector at a second end of the support structure.

8. The LED lighting system of claim 7 in which the electrical connectors at each of the first end and the second end of the support structure are compatible with fluorescent light receptacle attachment pins.

9. The LED lighting system of claim 8 in which the onboard current control circuitry is configured to provide constant current to the LEDs of the at least one LED array.

10. The LED lighting system claim 1 in which the support structure is made of a unitary piece of material that is both heat conductive and rigid.

11. The LED lighting system of claim 1 further comprising an optically transparent or translucent cover secured to the support structure over the at least one LED array.

12. The LED lighting system of claim 1 in which the support structure is hollow.

13. The LED lighting system of claim 1 in which the at least one LED array is provided on a front side of the support structure and the support structure has a domed shaped rear side.

14. The LED lighting system of claim 11 in which the combination of support structure and optically transparent cover has an egg shaped cross-section.

15. An LED lighting system for connection to a variable power source providing input power, comprising:
    a support structure;
    an electrical connector for connection to the variable power source;
    at least one LED array in the support structure;
    power control circuitry for the at least one LED array, the power control circuitry being carried by the support structure and being in electrical communication with the electrical connector;
    a circuit board supporting the at least one LED array, the corresponding power control circuitry being provided on the circuit board or on a separate board;
    the at least one LED array being divided into sets of LEDs of same or different colors;
    the power control circuitry being formed of one or multiple current controllers, each of the one or multiple current controllers providing current control for a corresponding set of LEDs in the LED array; and
    at least one power analyzing and processing circuitry connecting to the variable power source, and being configured to:
        identify one or more characteristics of the input power, where the characteristics are selected from amplitude, frequency, and pulse width of the input power,
        compare one or more of the characteristics of the input power to preset control criteria either in hardware or software or both to yield a comparison result, and
        control the current control circuitry providing same or different current control for a corresponding set of LEDs in the at least one LED array according to the comparison result.

16. An LED lighting system comprising:
    at least one LED array extending along a support structure spanning between a first end and a second end, wherein the support structure is made of rigid material, the support structure being sufficiently heat conductive to provide heat dissipation for the LEDs in the at least one LED array;

an electrical connector for connection to the power source;

at least one LED array extending along the support structure;

power control circuitry for the at least one LED array, the power control circuitry being carried by the support structure and being in electrical communication with the electrical connector;

at least a circuit board supporting the at least one LED array; and the power control circuitry including at least a current controller and a feedback circuit, the current controller being connected to receive a feedback signal from the feedback circuit and the current controller being configured to supply a constant average current to the LEDs of the at least one LED array.

17. The LED lighting system of claim 16 in which the at least one LED array is divided into sets of LEDs, the power control circuitry comprising multiple current controllers, each current controller of the multiple current controllers having a corresponding feedback circuit and each current controller of the multiple current controllers providing feedback controlled current control for a corresponding set of LEDs in the LED array.

18. The LED lighting system of claim 16 in which the power control circuitry is shared by multiple sets of LEDs in the at least one LED array.

19. The LED lighting system of claim 16 in which the power control circuitry is provided on a separate board from the at least a circuit board.

20. The LED lighting system of claim 16 in which the power control circuitry is provided on the at least a circuit board.

21. The LED lighting system of claim 1 further comprising a variable power source, the variable power source have controllable characteristics, the characteristics being selected from the group comprising voltage amplitude, power frequency, and pulse width.

* * * * *